(12) United States Patent
Lin

(10) Patent No.: US 9,621,530 B2
(45) Date of Patent: Apr. 11, 2017

(54) TRUST HEURISTIC MODEL FOR REDUCING CONTROL LOAD IN IOT RESOURCE ACCESS NETWORKS

(71) Applicant: QUALCOMM Incorporated, San Diego, CA (US)

(72) Inventor: James Minlou Lin, New Haven, CT (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 14/314,999

(22) Filed: Jun. 25, 2014

(65) Prior Publication Data

US 2015/0007273 A1    Jan. 1, 2015

Related U.S. Application Data

(60) Provisional application No. 61/841,068, filed on Jun. 28, 2013.

(51) Int. Cl.
*H04L 29/06* (2006.01)
*H04L 12/801* (2013.01)
(Continued)

(52) U.S. Cl.
CPC ............. *H04L 63/08* (2013.01); *H04L 47/10* (2013.01); *G06F 21/6218* (2013.01); *H04L 67/12* (2013.01)

(58) Field of Classification Search
CPC ......... H04L 63/08; H04L 63/10; H04L 63/20; H04L 63/0428; H04L 29/06; G06F 21/6218
See application file for complete search history.

(56) References Cited

U.S. PATENT DOCUMENTS 6,178,505 B1   1/2001   Schneider et al.
7,272,639 B1   9/2007   Levergood et al.
(Continued)

FOREIGN PATENT DOCUMENTS

EP       1337087 A2    8/2003
WO    2013160140 A1   10/2013

OTHER PUBLICATIONS

Guo B., et al., "From the internet of things to embedded intelligence," 2012, pp. 1-29.
(Continued)

*Primary Examiner* — Ali Abyaneh
*Assistant Examiner* — Shaqueal Wade
(74) *Attorney, Agent, or Firm* — Muncy, Geissler, Olds & Lowe, P.C.

(57) ABSTRACT

The disclosure relates to a trust heuristic model for reducing a control load in an IoT resource access network. For example, an authenticating node may challenge a client node that requests access to a resource and grant the access if the client node correctly responds to the challenge or alternatively deny the access if the client node incorrectly responds to the challenge. Furthermore, based on the response to the challenge, the client node may be assigned a trust level, which may be dynamically updated based on successive challenge-and-response exchanges and/or interactions with other IoT network nodes. For example, to reduce the resource access control load, subsequent challenge-and-response intervals may be increased or eliminated if the client node correctly responds to successive challenges over time, while client nodes that incorrectly respond to successive challenges over time may be blocked from accessing the resource or banned from the IoT network.

32 Claims, 16 Drawing Sheets

(51) Int. Cl.
*G06F 21/62* (2013.01)
*H04L 29/08* (2006.01)

(56) References Cited

U.S. PATENT DOCUMENTS

| | | | | |
|---|---|---|---|---|
| 8,510,818 | B2* | 8/2013 | Garg | H04L 63/0815 713/182 |
| 2003/0235309 | A1* | 12/2003 | Struik | H04L 63/065 380/278 |
| 2006/0005032 | A1 | 1/2006 | Cain et al. | |
| 2006/0143063 | A1* | 6/2006 | Braun | G06Q 10/06 705/7.12 |
| 2007/0058601 | A1* | 3/2007 | Davis | H04L 63/08 370/338 |
| 2008/0319904 | A1* | 12/2008 | Carlson | G06Q 20/04 705/44 |
| 2009/0133117 | A1* | 5/2009 | Bentley | H04L 63/0846 726/17 |
| 2010/0228767 | A1 | 9/2010 | Slinker et al. | |
| 2011/0184586 | A1* | 7/2011 | Asano | G05B 15/02 700/297 |
| 2013/0024577 | A1 | 1/2013 | Krishnaswamy et al. | |
| 2013/0064073 | A1 | 3/2013 | Cheng et al. | |
| 2013/0145030 | A1* | 6/2013 | Ohira | H04M 1/72533 709/225 |

OTHER PUBLICATIONS

International Search Report and Written Opinion—PCT/US2014/044362—ISA/EPO—Oct. 9, 2014.
Qiu Q., et al., "A Trust-based DRM Scheme for Content Sharing in an Open Environment", ICIMP 2012 : The Seventh International Conference on Internet Monitoring and Protection, 2012, pp. 47-53.
Sun Y.L., et al., "A Trust Evaluation Framework in Distributed Networks: Vulnerability Analysis and Defense Against Attacks", INFOCOM 2006. 25th IEEE International Conference on Computer Communications. Proceedings, Apr. 23-29, 2006, pp. 1-14.
Zhang Z., et al., "Security and Trust in Digital Rights Management: A Survey", International Journal of Network Security, vol. 9, No. 3, pp. 247-263, Nov. 2009.
Shangqin X., et al., "A Trust Scheme Based DRM Model for P2P System," Wuhan University Journal of Natural Sciences, Sep. 2006, vol. 11 (5), pp. 1373-1377.

* cited by examiner

US 9,621,530 B2

TRUST HEURISTIC MODEL FOR REDUCING CONTROL LOAD IN IOT RESOURCE ACCESS NETWORKS

CROSS-REFERENCE TO RELATED APPLICATIONS

The present Application for Patent claims the benefit of Provisional Patent Application No. 61/841,068 entitled "TRUST HEURISTIC MODEL FOR REDUCING CONTROL LOAD IN IOT RESOURCE ACCESS NETWORKS," which was filed on Jun. 28, 2013, and which is assigned to the assignee hereof and hereby expressly incorporated herein by reference in its entirety.

TECHNICAL FIELD

Various embodiments described herein generally relate to reducing control load in Internet of Things (IoT) resource access networks using a trust heuristic model.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous IoT devices surrounding a user at home, in vehicles, at work, and many other locations. In many cases, IoT networks may include various resources to which different IoT capable devices may require access, whereby control mechanisms may be used to authenticate or otherwise regulate access to the controlled resources. Accordingly, the IoT capable devices accessing a particular controlled resource may require an "always-on" network connection to periodically authenticate access to the controlled resource, which may lead to various problems because servers or other authentication entities that regulate or otherwise control access to the controlled resource may experience a substantial control load that may disrupt services that access the controlled resource and prevent clients from accessing the services. When adapted to the IoT concept, if a network includes various devices that communicate over a control channel to access a controlled resource, excessive traffic on the control channel could potentially disrupt resource usage. Accordingly, a need exists for mechanisms that may be used to reduce control loads used to authenticate or otherwise control access to controlled resources in IoT networks.

SUMMARY

The following presents a simplified summary relating to one or more aspects and/or embodiments associated with the mechanisms disclosed herein to reduce control load in Internet of Things (IoT) resource access networks using a trust heuristic model. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein to reduce control load in IoT resource access networks using a trust heuristic model in a simplified form to precede the detailed description presented below.

According to one exemplary aspect, the trust heuristic model used to reduce the control load in the IoT resource access network may be based on a challenge-and-response mechanism used between a requesting node that wants to access a controlled resource and an authenticating node that regulates the controlled resource or acts as an intermediary to relay access between the requesting node and the node that regulates the controlled resource (e.g., if the requesting node cannot directly contact the regulating node). For example, the authenticating node may send a challenge to a node that requests access to a controlled resource and determine whether to grant the requested access based on a response to the challenge. As such, the authenticating node may generally grant the requested access if the requesting node correctly responds to the challenge or alternatively deny the requested access if the requesting node incorrectly responds to the challenge. Furthermore, the authenticating node may assign an appropriate trust level to the requesting node based on whether the response to the initial challenge was correct or incorrect, and the trust level assigned to the requesting node may be dynamically updated based on successive challenge-and-response exchanges and/or interactions with other nodes in the IoT network.

According to another exemplary aspect, challenge-and-response mechanisms are conventionally repeated at regular intervals to ensure that nothing has changed in the time after an initial correct response to the challenge and to periodically re-authenticate the requesting node, which may occupy unnecessary bandwidth and reduce performance due to excessive traffic on a control channel (e.g., in a wireless system). In contrast, the trust heuristic model disclosed herein may reduce the control load associated with challenge-and-response exchanges or other traffic that may otherwise be used to control resource access. For example, in one embodiment, after a requesting node correctly responds to an initial challenge, intervals between subsequent challenges may be increased if the requesting node continues to correctly respond to one or more successive challenges over time. Furthermore, the requesting node may be granted access to the controlled resource without having to correctly respond to challenges if the authenticating node and/or other nodes in the IoT network trust the requesting node from previous interactions. Alternatively, the requesting node may be blocked from accessing the controlled resource or banned from the IoT network altogether if the requesting node continues to provide incorrect responses to one or more successive challenges over time.

According to another exemplary aspect, the trust heuristic model disclosed herein may therefore model trust between two or more nodes in the IoT network based on successive challenge-and-response exchanges that occur over time. Furthermore, the trust may be modeled at different levels in a similar manner to how people may categorize relationships with others according to acquaintances, colleagues, friends, confidants, and so on, wherein access to controlled resources can be aligned along similar paths to allow nodes in the IoT network to model trust. For example, the trust heuristic model may include an Unknown Trust level at which requesting nodes may be allowed into the IoT network and/or allowed to have messages forwarded or otherwise relayed within the IoT network, a Preliminary Trust level at which requesting nodes may be allowed to access plentiful or infinite resources, a Trusted level at which requesting nodes may be allowed to access limited, constrained, or other finite resources, a Confidant level at which requesting nodes may be allowed to access protected resources, and a Not Trusted level at which requesting nodes that have failed to correctly respond to multiple successive challenges may be banned from the IoT network. Accordingly, the trust heuristic model may generally have N trust levels (e.g., five in the exemplary trust heuristic model described above) and a node may be assigned a particular trust level based on interactions with other nodes and resources in the IoT network over time. For example, in one embodiment, the N trust levels in the trust heuristic logical model may be defined within a certain range and a particular node may initially be assigned a default trust metric within the range that may be subsequently increased or decreased based on challenge-and-response exchanges, interactions with other nodes and resources, or other suitable criteria over time to determine the appropriate trust level to assign to the node.

According to another exemplary aspect, a method for controlled resource access in an IoT network may comprise requesting access to a first controlled resource in the IoT network by a requesting node, wherein access to the resource may include a requirement to periodically complete an authentication procedure, and the method may further comprise responding to a challenge message received from a first gatekeeper node (e.g., a regulating node that regulates the controlled resource, an intermediate node that relays messages between the requesting node and a regulating node that regulates the controlled resource, etc.) and receiving the requested access to the resource in response to correctly responding to the challenge message, wherein the first gatekeeper node may reduce the requirement to periodically complete the authentication procedure in response to the requesting node correctly responding to one or more successive challenge messages. For example, in one embodiment, the gatekeeper node may increase an interval before transmitting a subsequent challenge message to the requesting node to reduce the requirement to periodically complete the authentication procedure and thereby reduce a load on a control channel used to exchange the challenge message and the response thereto.

According to another exemplary aspect, the method for controlled resource access in the IoT network may further comprise the first gatekeeper node decreasing the trust level associated with the requesting node in response to receiving the requesting node providing an incorrect response to the challenge message. Furthermore, the first gatekeeper node may temporarily block the requesting node from communicating over the IoT network and/or permanently ban the requesting node from communicating over the IoT network in response to the requesting node incorrectly responding to the challenge message and continuing to incorrectly respond to one or more successive challenge messages over time. Further still, in one embodiment, the first gatekeeper node may adjust the requirement to periodically complete the authentication procedure according to a trust level assigned to the requesting node in response to the IoT network migrating to a new network access layer (e.g., nodes having a preliminary trust level may still be issued challenges, nodes that have a trusted status may be issued a single challenge, and nodes that have a confidant status may not be issued any challenges).

According to another exemplary aspect, the method for controlled resource access may further comprise requesting access to a second controlled resource (e.g., in the IoT network or a different IoT network) from a second gatekeeper node, wherein the second gatekeeper node may determine whether to grant the requesting node access to the second controlled resource based solely on a trust level between the requesting node and a trusted node having one or more previous interactions with the requesting node (e.g., without requiring the requesting node to complete the authentication procedure). For example, in one embodiment, the trust level associated with the requesting node may comprise one of N trust levels in a trust heuristic logical model that defines the permitted resource access associated with nodes having each respective trust level. Furthermore, in different use cases, the second controlled resource, the second gatekeeper node, and/or the trusted node may be located in the IoT network or a different IoT network.

According to another exemplary aspect, the controlled resource in the IoT network may generally comprise an infinite resource having a production rate that equals or exceeds a consumption rate or a finite resource having a consumption rate that exceeds a production rate. In the latter case, where the controlled resource comprises a finite resource having a consumption rate that exceeds a production rate, the gatekeeper node may comprise an intermediate node having allocated access to the finite resource, and the access allocated to the intermediate node may comprise a first portion that the intermediate node requires and an extra portion that can be supplied to one or more requesting nodes. As such, when requesting the access to the controlled resource, the requesting node may contact one or more intermediate nodes that have allocated access to the finite resource to determine the total extra portion of the finite resource allocated thereto and request that the one or more intermediate nodes supply an amount of the finite resource that the requesting node requires in response to determining that the total extra portion of the finite resource allocated thereto meets or exceeds the amount of the finite resource that the requesting node requires. In this context, the requesting node may receive the challenge message from the one or more intermediate nodes in response to requesting that the one or more intermediate nodes supply the amount of the finite resource that the requesting node requires and receive the required amount of the finite resource from the one or more intermediate nodes in response to transmitting a correct response to the challenge message to each intermediate node.

According to another exemplary aspect, an IoT device may comprise means for requesting access to a controlled resource in an IoT network, wherein access to the controlled resource may include a requirement to periodically complete an authentication procedure, means for responding to a challenge message received from a gatekeeper node, and means for receiving the requested access to the controlled resource in response to correctly responding to the challenge message, wherein the gatekeeper node may reduce the requirement to periodically complete the authentication procedure in response to the IoT device correctly responding to one or more successive challenge messages.

According to another exemplary aspect, a computer-readable storage medium may have computer-executable instructions recorded thereon, wherein executing the computer-executable instructions on an IoT device may cause the IoT device to request access to a controlled resource in an IoT network, wherein access to the controlled resource may include a requirement to periodically complete an authentication procedure, respond to a challenge message received from a gatekeeper node, and receive the requested access to the controlled resource in response to correctly responding to the challenge message, wherein the gatekeeper node may reduce the requirement to periodically complete the authentication procedure in response to the IoT device correctly responding to one or more successive challenge messages.

According to another exemplary aspect, a method for controlling resource access in an IoT network may comprise, among other things, receiving a request to access a controlled resource in the IoT network from a requesting node, wherein access to the controlled resource includes a requirement to periodically complete an authentication procedure, transmitting a challenge message to the requesting node, receiving a response to the challenge message from the requesting node, and determining whether to grant the requesting node access to the controlled resource based on the received response to the challenge message, wherein the requirement for the requesting node to periodically complete the authentication procedure may be adjusted based on whether the received response to the challenge message was correct.

Other objects and advantages associated with the mechanisms disclosed herein to reduce control load in IoT resource access networks using a trust heuristic model described herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device, according to various aspects of the disclosure, while

DETAILED DESCRIPTION

Figure 1A:
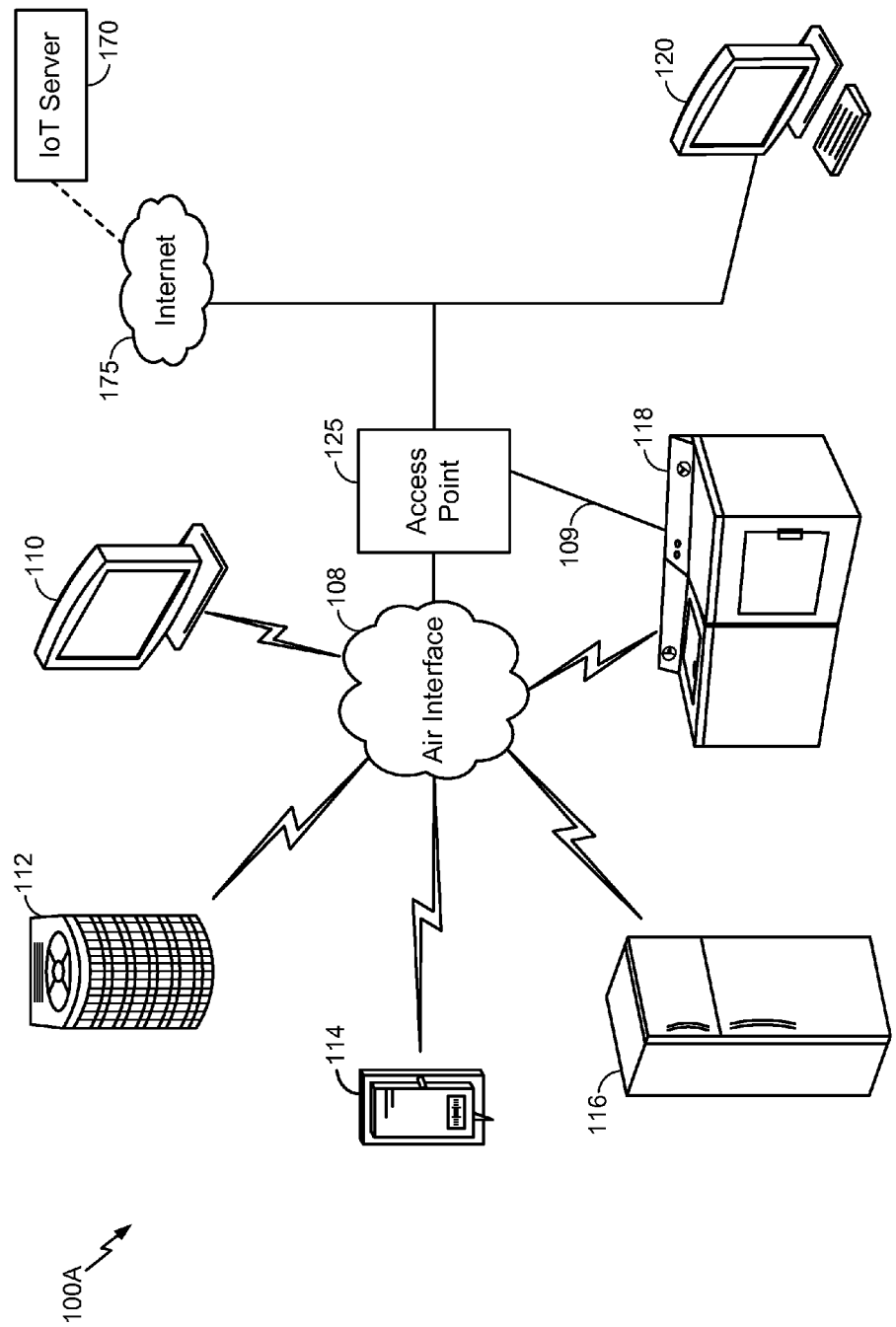
FIGS. 1A-1E illustrates exemplary high-level system architectures of a wireless communications system, according to various aspects of the disclosure.

Various aspects are disclosed in the following description and related drawings to show specific examples relating to exemplary embodiments in which a control load in an Internet of Things (IoT) resource access network may be reduced using a trust heuristic model. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
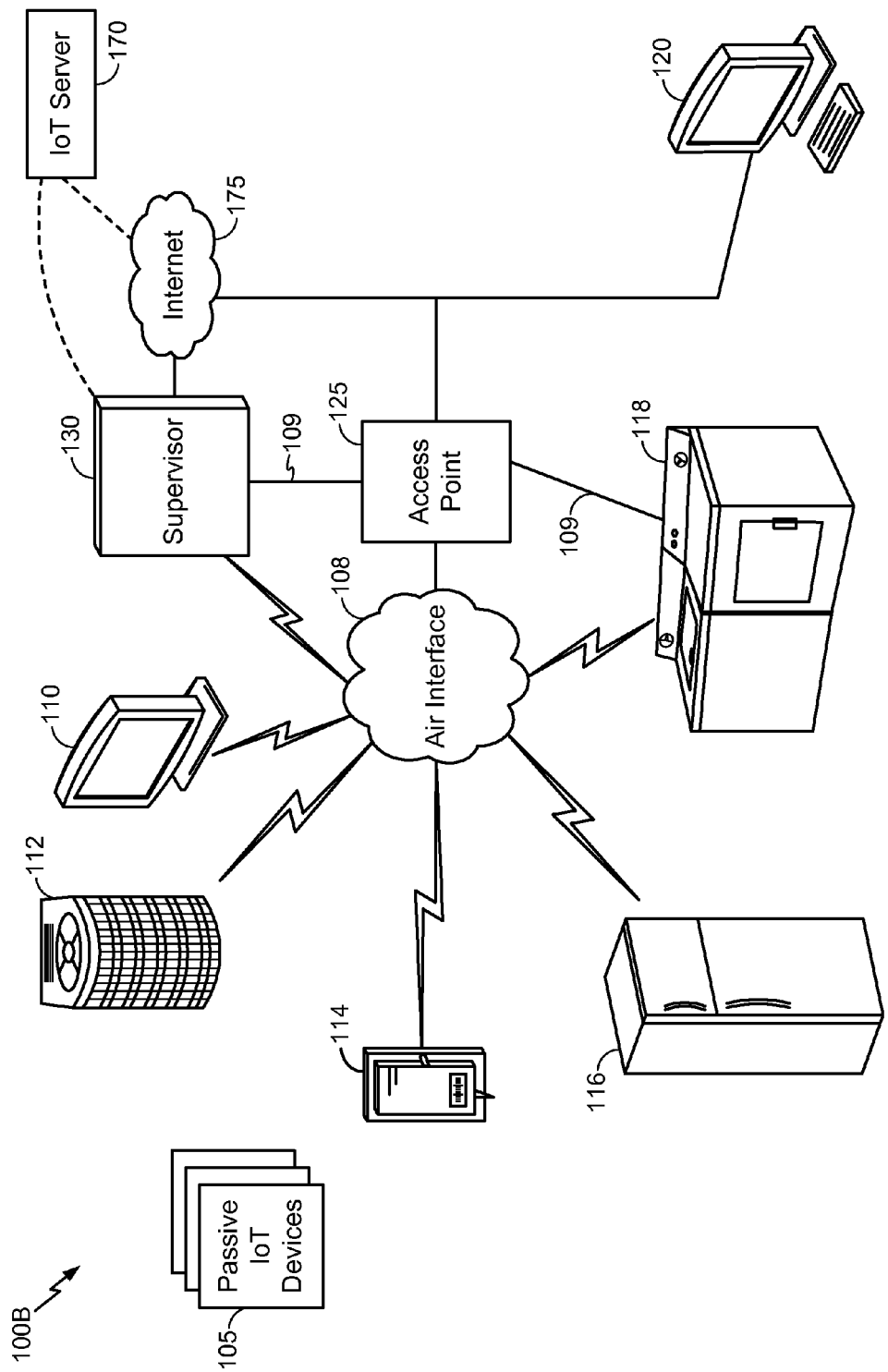

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communications system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
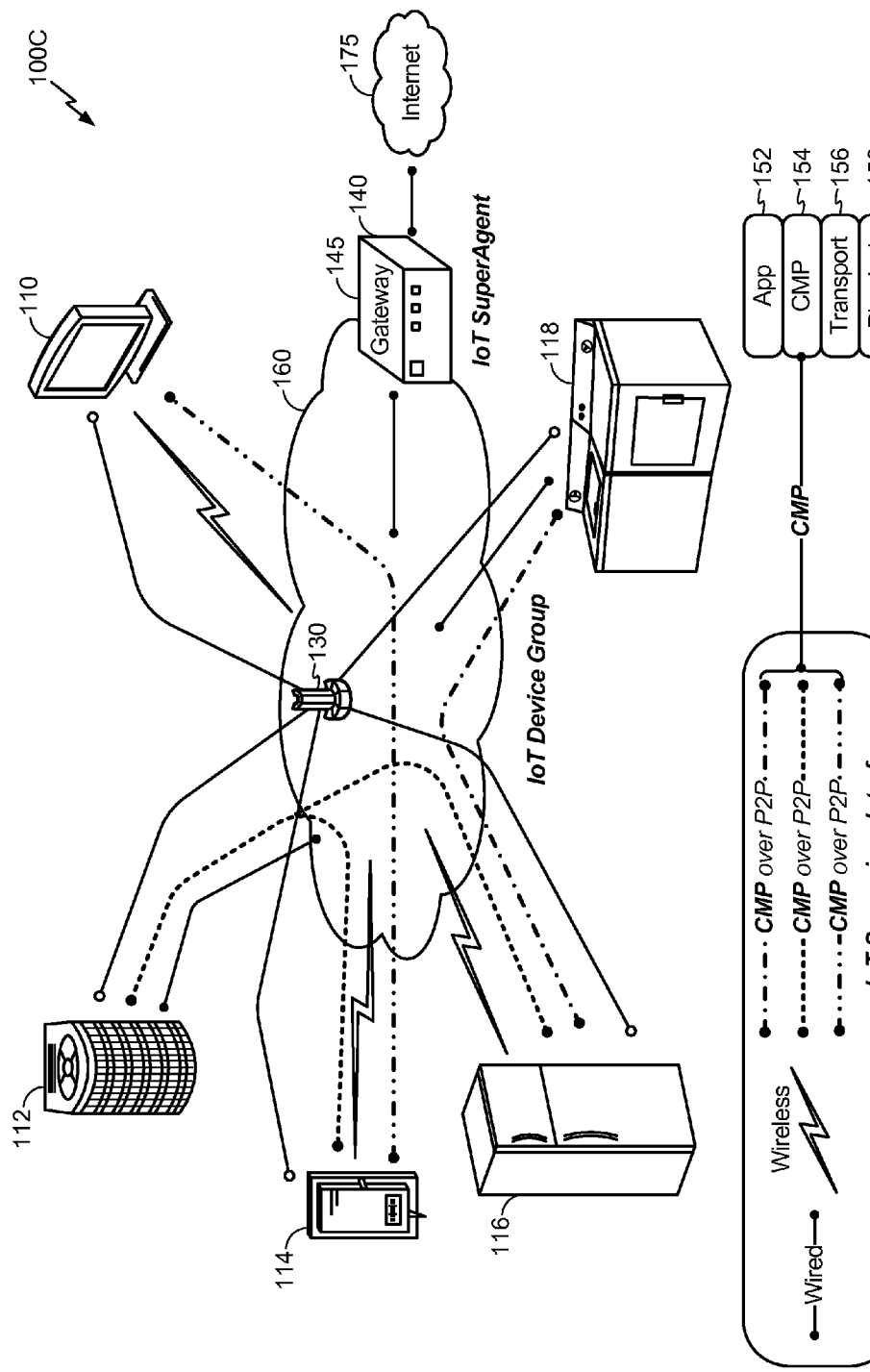

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
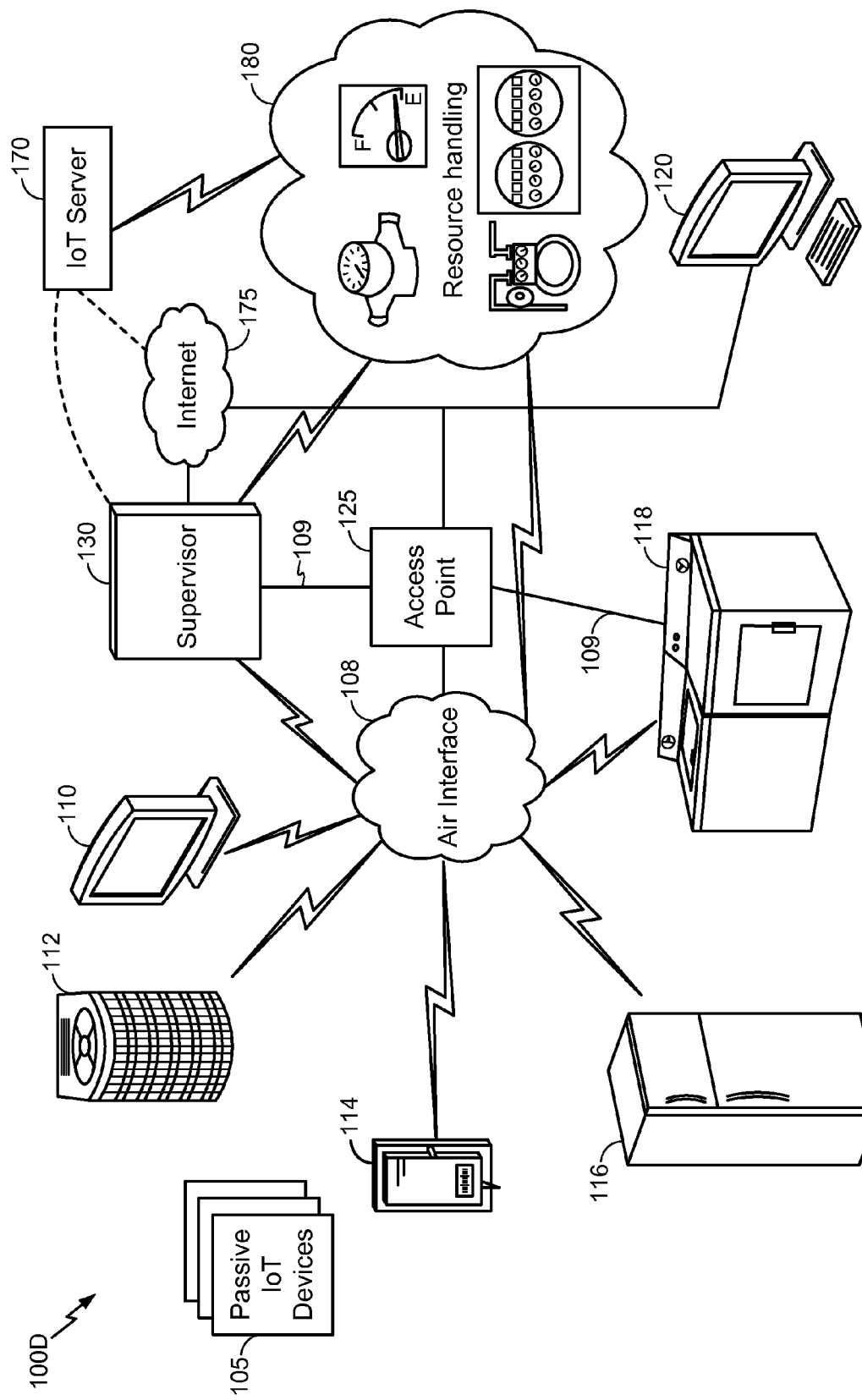

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1A-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
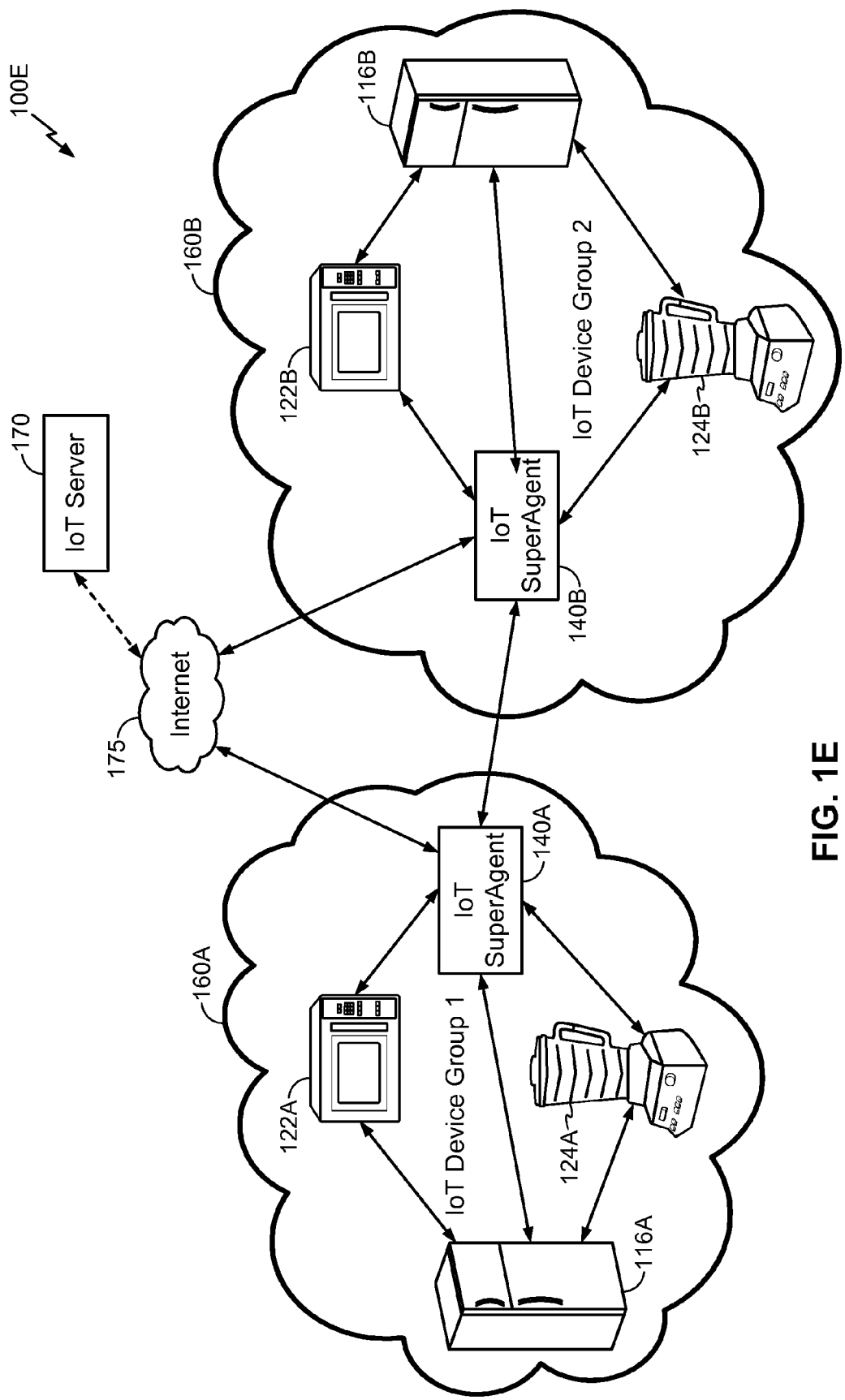

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1A-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

In the exemplary wireless communications systems 100A-100E shown in FIGS. 1A-E, respectively, the IoT server 170 and/or the supervisor device 130 may organize the various IoT devices 110-120 and/or the passive IoT devices 105 into one or more small and relevant IoT device groups 160 to enable sharing resources 180 within and/or among the IoT device groups 160 (e.g., to control usage associated with various resources 180 that may be shared among the IoT devices 110-120 and/or passive IoT devices 105 in the IoT device groups 169). For example, in one embodiment, the IoT server 170 and/or the supervisor device 130 may provide a distributed network service (e.g., a cloud service) that can represent each IoT device 110-120 and/or passive IoT device 105 in the wireless communications systems 100A-100E with a device-specific globally unique identifier (e.g., a D_GUID) and a group-specific globally unique identifier (e.g., a G_GUID) and that can further represent each shared resource 180 in the wireless communications systems 100A-100E with a resource-specific globally unique identifier (e.g., a R_GUID). Accordingly, the D_GUIDs, G_GUIDs, and R_GUIDs may be used to control or otherwise coordinate sharing the resources 180 within a particular IoT device group 160 and/or between various different IoT device groups 160.

For example, in the exemplary wireless communications systems 100A-100E shown in FIGS. 1A-E, the IoT server 170 and/or the supervisor device 130 may be provisioned with one or more D_GUIDs that represent the various IoT devices 110-120 and/or passive IoT devices 105. Additionally, in response to a new device powering up or otherwise registering with the IoT server 170 and/or the supervisor device 130 after connecting to the IoT network, a new D_GUID may be allocated to the new device to allow the new device to be reached and various properties may be associated with the D_GUID allocated to the new device (e.g., a description, location, type, etc.). In one embodiment, the IoT server 170 and/or the supervisor device 130 may be further provisioned with R_GUIDs that correspond to resources 180 shared within the IoT network and which devices may need to operate on or otherwise interact with. For example, the resources 180 may generally include water, electricity, sunlight, roads, food, or any other suitable resource 180, which may be uniquely identified within a context according to location, household, or other suitable attributes associated with the resources 180. Furthermore, the IoT server 170 and/or the supervisor device 130 may be provisioned with G_GUIDs that represent each IoT device group 160 that works together (e.g., in a household, a lawn sprinkler, water heater, refrigerator, bathtub, etc. may all operate on shared water resources 180). The G_GUIDs may further include various attributes that define a context associated with the IoT device group 160 (e.g., household, location, owner, etc.) and the resources 180 shared therein. In one embodiment, the IoT server 170 and/or supervisor device 130 may further be provisioned with various policies to define hierarchies, rankings, priorities, or other relationships among the various IoT devices 110-120 and passive IoT devices 105 in addition to the IoT device groups 160 to which they are allocated, the resources 180 shared therein, and any policies to control contending access to the resources 180.

In one embodiment, in response to having suitably provisioned the IoT server 170 and/or the supervisor device 130 with the various D_GUIDs, G_GUIDs, R_GUIDs, and policies, the IoT server 170 and/or the supervisor device 130 may then discover the various IoT device groups 160 and the various resources 180 shared thereby. For example, in one embodiment, an R_GUID may be statically provisioned to or otherwise associated with one or more D_GUIDs that correspond to devices that require access to a certain shared resource 180. In another example, a device that wishes to access a certain shared resource 180 may query the IoT server 170 and/or the supervisor device 130 based on a location, description, or other suitable attributes associated therewith, and the device may then select an appropriate resource 180 from a list that the IoT server 170 and/or the supervisor device 130 returns to the device. Further still, in one embodiment, one or more resources 180 may be tagged with an RFID, bar code, or other suitable data that the IoT devices 110-120 can read in order to dynamically discover the resources 180. Furthermore, in one embodiment, the IoT server 170 and/or the supervisor device 130 may employ a query mechanism to discover the IoT device groups 160 based on context or information input to a suitable user interface (e.g., owners associated with two IoT device groups 160 may exchange G_GUIDs to initiate interaction between the two IoT device groups 160). In another example, based on the permissions, rules, or other policies provisioned to the IoT server 170 and/or the supervisor device 130, two or more IoT device groups 160 can be permanently or temporarily merged to enable the two or more IoT device groups 160 to use the resources 180 shared within each IoT device group. Furthermore, as described in further detail below, a trust heuristic model may be implemented in the wireless communications systems 100A-100E to ensure that IoT devices requesting access to shared resources 180 have proper authentication credentials, resolve competing requests to the same shared resource 180, or otherwise control access to the shared resources 180 in a manner that may reduce a control load associated with regulating access to the shared resources 180.

Figure 2A:
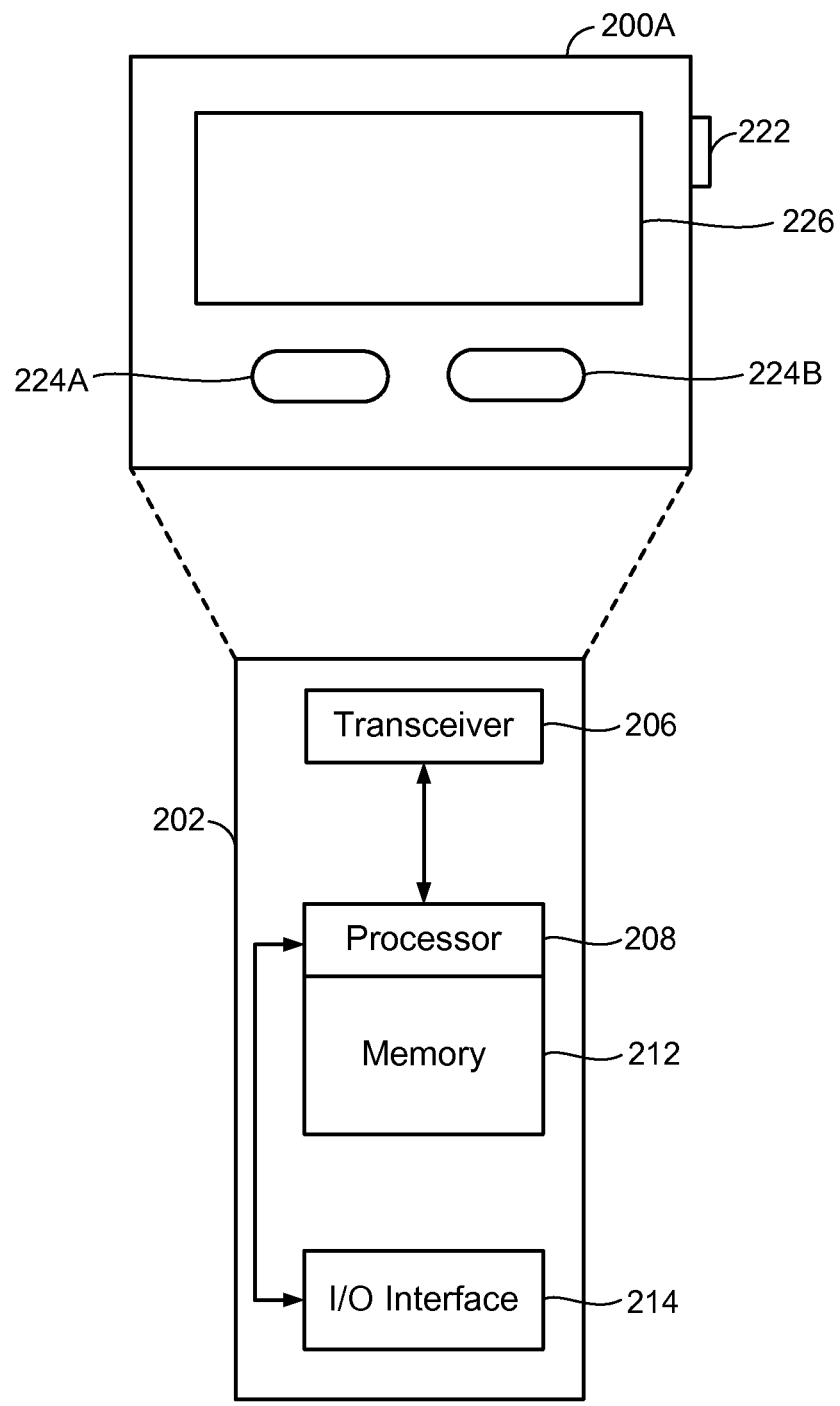

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A, 1B, and 1D.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface (e.g., air interface 108 in FIGS. 1A, 1B, and 1D) and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
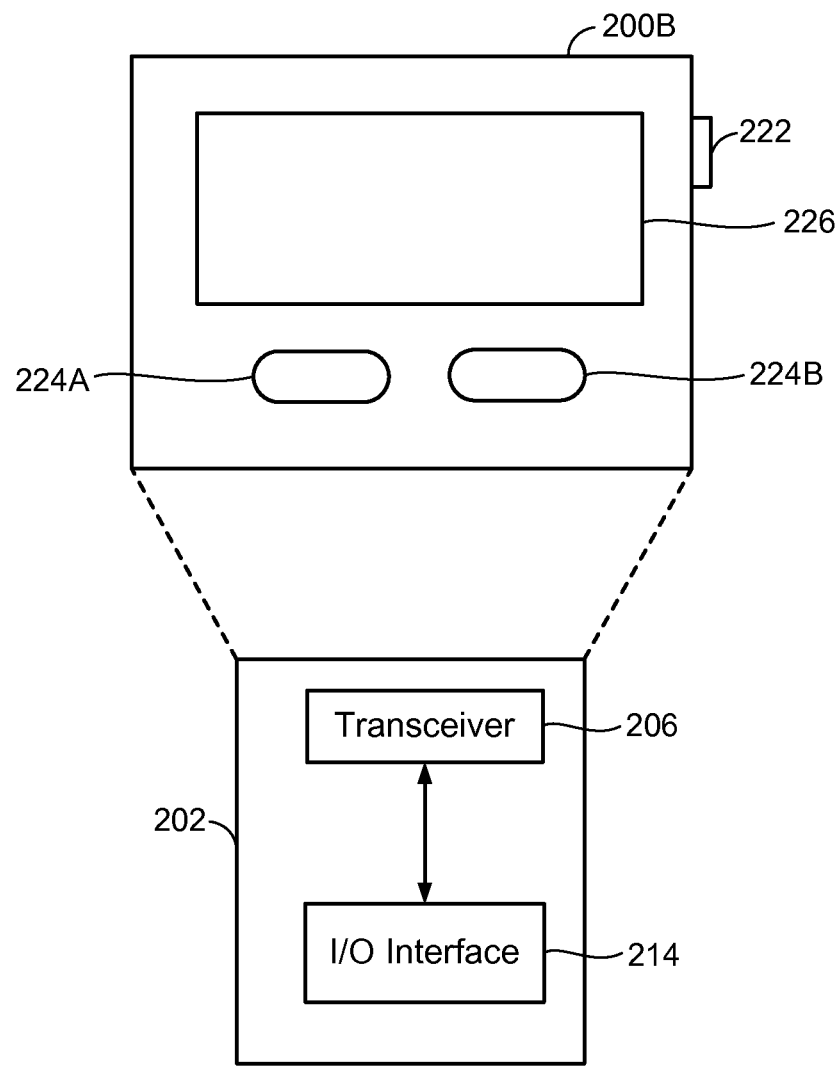
FIG. 2B illustrates an exemplary passive IoT device, according to various aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
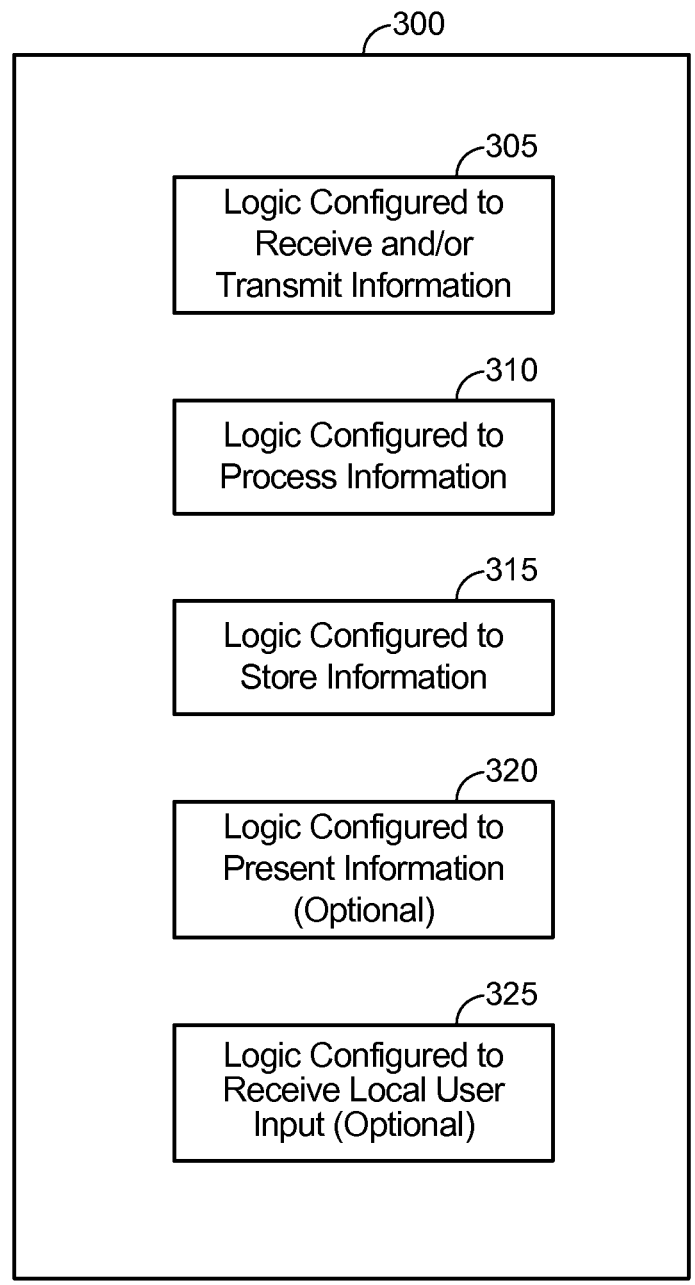
FIG. 3 illustrates an exemplary communication device that includes logic configured to perform functionality, according to various aspects of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-E of FIGS. 1A-E.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
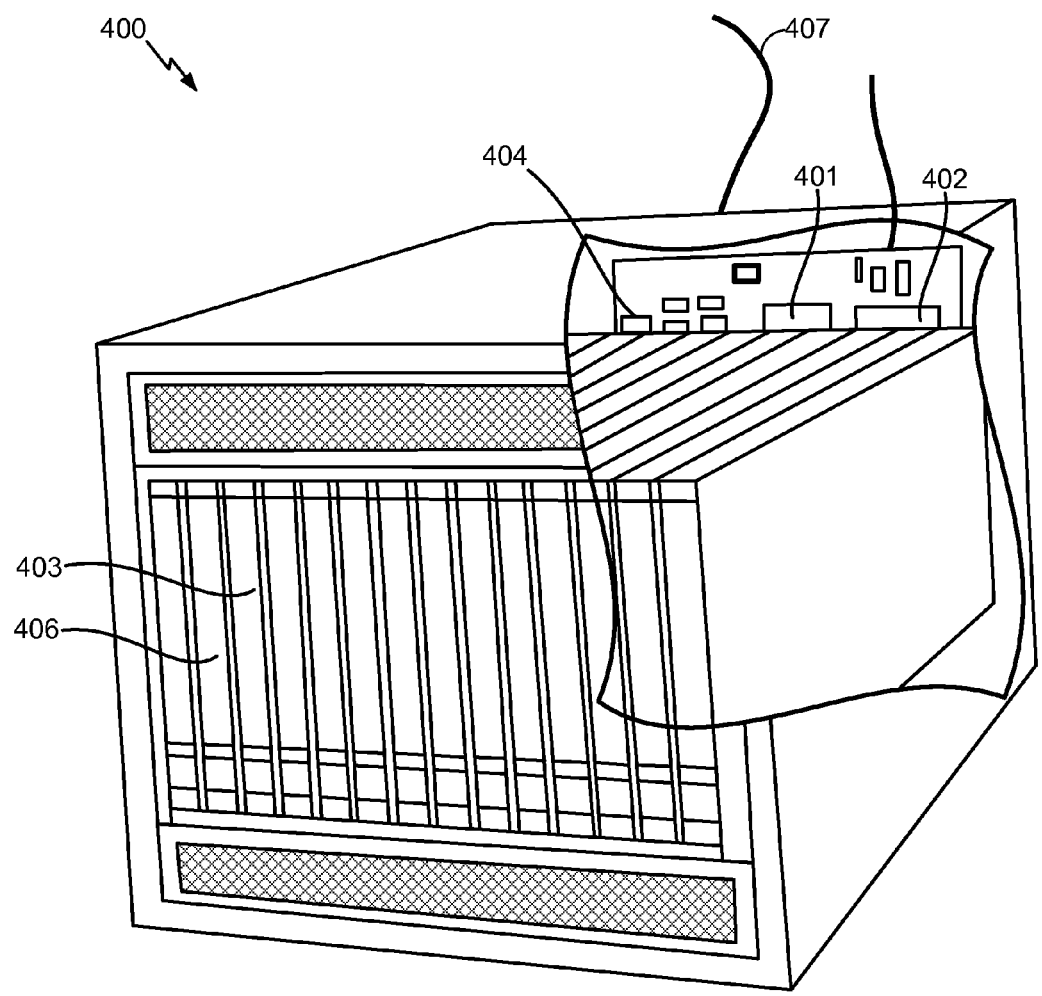
FIG. 4 illustrates an exemplary server, according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

In general, as mentioned above, the increasing development in IoT technologies will lead to numerous IoT devices surrounding a user at home, in vehicles, at work, and many other locations, whereby many IoT networks may implement control mechanisms to authenticate or otherwise regulate access to controlled resources that different IoT devices may want to access. More particularly, the control mechanisms may be used to ensure that IoT devices requesting access to the controlled resources have proper authentication credentials, resolve competing requests to the same controlled resource, or otherwise control resource access. For example, exemplary resources that can be regulated using the IoT concept may include network access, electricity, gas, storage, security, natural gas, gasoline, hot water, or any other suitable computational, physical, or logical resource to which IoT devices may require access. Accordingly, because excessive traffic on a control channel used in an IoT network to regulate access to controlled resources could potentially disrupt usage associated with the controlled resources (e.g., if various devices communicate over the control channel to access the controlled resources), the aspects and embodiments described in further detail herein may use a trust heuristic model to reduce the control load associated with regulating access to the controlled resources in the IoT network.

Figure 5:
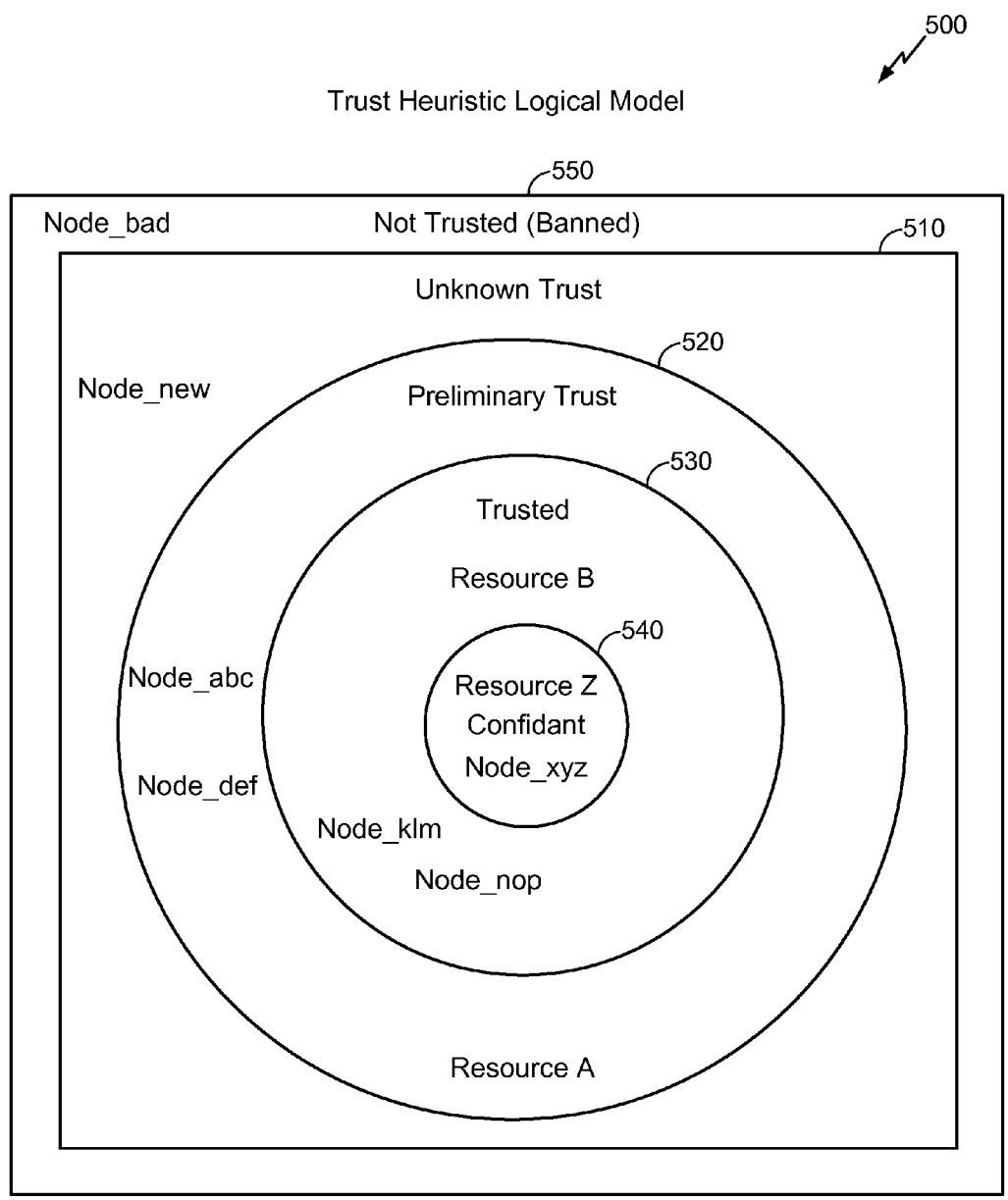
FIG. 5 illustrates an exemplary trust heuristic model that may be used to reduce a control load in an IoT resource access network, according to one aspect of the disclosure.

More particularly, according to one aspect of the disclosure, FIG. 5 illustrates an exemplary trust heuristic model 500 that may be used to reduce a control load in the IoT resource access network. In one embodiment, the trust heuristic model 500 may be based on a challenge-and-response mechanism used between a requesting node that wants to access a controlled resource (e.g., Resource A, Resource B, Resource Z, etc.) and an authenticating node that regulates the controlled resource or acts as an intermediary to relay access between the requesting node and the node that regulates the controlled resource (e.g., if the requesting node does not have a communication range that allows direct contact with the regulating node). For example, in response to receiving a request to access the controlled resource from the requesting node, the authenticating node may send a challenge to the requesting node and determine whether to grant the requesting node access to the controlled resource based on a response to the challenge (e.g., a correct response to the challenge may depend on the requesting node having one or more credentials that can be used to verify trust based on a password, a generic authentication certificate, or other shared secret). As such, the authenticating node may generally grant the requesting node access to the controlled resource if the requesting node correctly responds to the challenge or alternatively deny the requesting node access to the controlled resource if the requesting node provides an incorrect response to the challenge. Furthermore, the authenticating node may assign an appropriate trust level to the requesting node based on whether the response to the initial challenge was correct or incorrect, and the trust level assigned to the requesting node may be dynamically updated based on successive challenge-and-response exchanges and/or interactions with other nodes in the IoT network.

In particular, conventional challenge-and-response mechanism may generally be repeated at regular intervals to ensure that nothing has changed in the time after an initial correct response to the challenge and to periodically re-authenticate the requesting node, which may occupy unnecessary bandwidth and reduce performance due to excessive traffic on a control channel (e.g., in a wireless system). In contrast, the trust heuristic model 500 shown in FIG. 5 may be used to reduce the control load associated with challenge-and-response exchanges or other traffic that may otherwise be used to control resource access. For example, in one embodiment, an authenticating node may issue an initial challenge to a requesting node in response to receiving a request to access a controlled resource from the requesting node, and intervals between subsequent challenges may then be increased if the requesting node correctly responds to one or more successive challenges. Furthermore, the authenticating node may grant the requesting node access to the controlled resource without employing the challenge-and-response mechanism if the authenticating node and/or other nodes in the IoT network trust the requesting node from previous interactions or alternatively block the requesting node from accessing the controlled resource or ban the requesting node from the IoT network altogether if the requesting node provides incorrect response to one or more successive challenges.

Accordingly, the trust heuristic model 500 may be used to model trust between two or more nodes in the IoT network and/or two or nodes in different IoT networks based on successive challenge-and-response exchanges that occur over time. Furthermore, the trust may be modeled at different levels in a similar manner to how people may categorize relationships with others according to acquaintances, colleagues, friends, confidants, and so on, wherein access to controlled resources can be aligned along similar paths to allow nodes in the IoT network and/or nodes in different IoT networks to model trust. For example, referring to FIG. 5, the trust heuristic model 500 may include an Unknown Trust level 510 at which requesting nodes may be allowed into an IoT network and/or allowed to have messages forwarded or otherwise relayed within the IoT network, a Preliminary Trust level 520 at which requesting nodes may be allowed to access plentiful or infinite resources (e.g., electricity), a Trusted level 530 at which requesting nodes may be allowed to access limited, constrained, or other finite resources (e.g., Wi-Fi bandwidth), a Confidant level 540 at which requesting nodes may be allowed to access protected resources (e.g., database records), and a Not Trusted level 550 at which requesting nodes that have failed to correctly respond to multiple successive challenges may be banned from the IoT network. Accordingly, the trust heuristic model 500 may generally have N trust levels (e.g., five in the exemplary trust heuristic model 500 shown in FIG. 5) and a node may be assigned a particular trust level based on interactions with other nodes and resources in the IoT network over time. For example, in one embodiment, the N trust levels in the trust heuristic model 500 may be defined within a certain range (e.g., from −100 to +100) and a particular node may initially be assigned a zero (0) trust metric that may then be subsequently increased or decreased based on challenge-and-response exchanges, interactions with other nodes and resources, or other suitable criteria over time to determine the appropriate trust level to assign to the node.

For example, referring to FIG. 5, Node_new may initially have the Unknown Trust level 510 after being newly introduced to the IoT network, while Node_abc and Node_def may have the Preliminary Trust level 520 and be allowed to access a plentiful Resource A based on correctly responding to an initial challenge from an authenticating node. Furthermore, Node_klm and Node_nop may be assigned the Trusted level 530 and allowed to access a limited Resource B in addition to the plentiful Resource A after correctly responding to successive challenges, and the interval before Node_klm and Node_nop are required to respond to successive challenges may be increased. Further still, Node_xyz may be assigned the Confidant trust level 540 and allowed to access a protected Resource Z in addition to the limited Resource B and plentiful Resource A after providing further correct responses to successive challenges, and the interval before Node_xyz will be required to respond to another challenge may be further increased or the requirement to respond to another challenge may be eliminated altogether. However, Node_bad may have failed to correctly respond to one or more challenges, resulting in Node_bad having the Not Trusted status 550, whereby Node_bad may be banned from communicating over the IoT network for a certain time period or banned from the IoT network altogether such that authorized nodes can ignore traffic from Node_bad and thereby avoid disruptions to the IoT network due to Node_bad potentially flooding the control channel with junk data (e.g., to prevent spam, brute force attacks, denial-of-service attacks, etc.).

In another embodiment, the trust heuristic model 500 shown in FIG. 5 can be used to regulate connections over a different connection mechanism. More particularly, as was described above in relation to FIG. 1D, the IoT Server 170 may regulate the connection with or without the Internet 175. As such, if the underlying network governed in FIG. 5 migrated to a new network access layer, there could be different behaviors for different nodes based on prior experience. For example, in one embodiment, the migration could be a case where all nodes change from some cellular interface to a Wi-Fi interface. In another example, the migration could be a change from one Wi-Fi interface to another Wi-Fi interface (e.g., from an 802.11a interface to an 802.11n interface). In any case, based on the migration or handoff scenario that occurs in the network, the trust heuristic model 500 shown in FIG. 5 may provide different behaviors for nodes having different trust levels. For example, nodes that have the Preliminary Trust level 520 (e.g., Node_abc and Node_def) could still be issued challenges, nodes that have the Trusted status 530 (e.g., Node_klm and Node_nop) may be issued a single challenge, and nodes that have the Confidant status 540 (e.g., Node_xyz) may not be issued any challenges. As such, a requirement to periodically complete a successful challenge-and-response exchange or another suitable authentication procedure may be adjusted according to trust levels in the trust heuristic model 500 that are assigned to different nodes in response to the IoT network migrating to a new network access layer.

Figure 6:
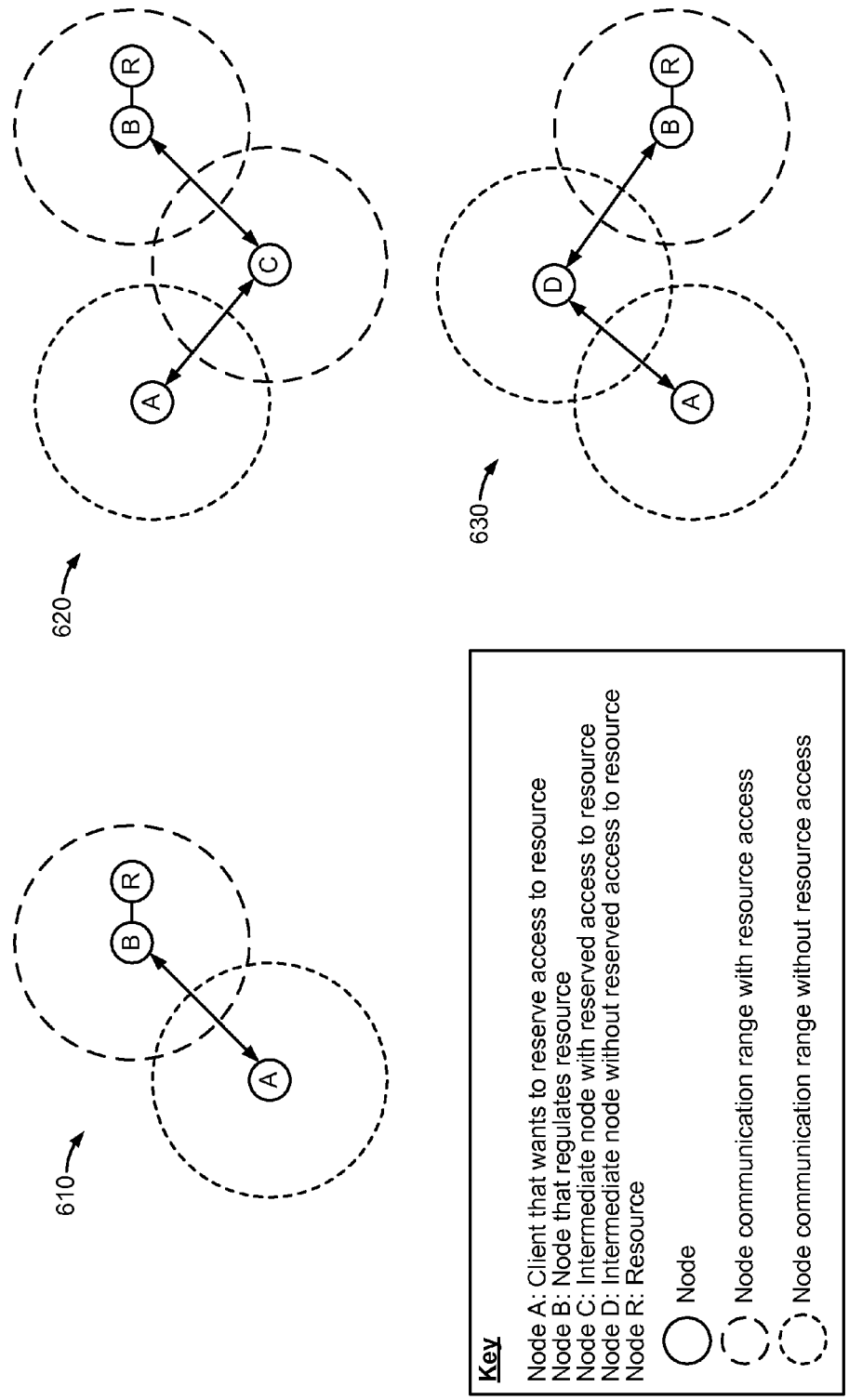
FIG. 6 illustrates exemplary communication scenarios in which one or more clients may request access to a controlled resource in an IoT resource access network, according to one aspect of the disclosure.
Figure 7:
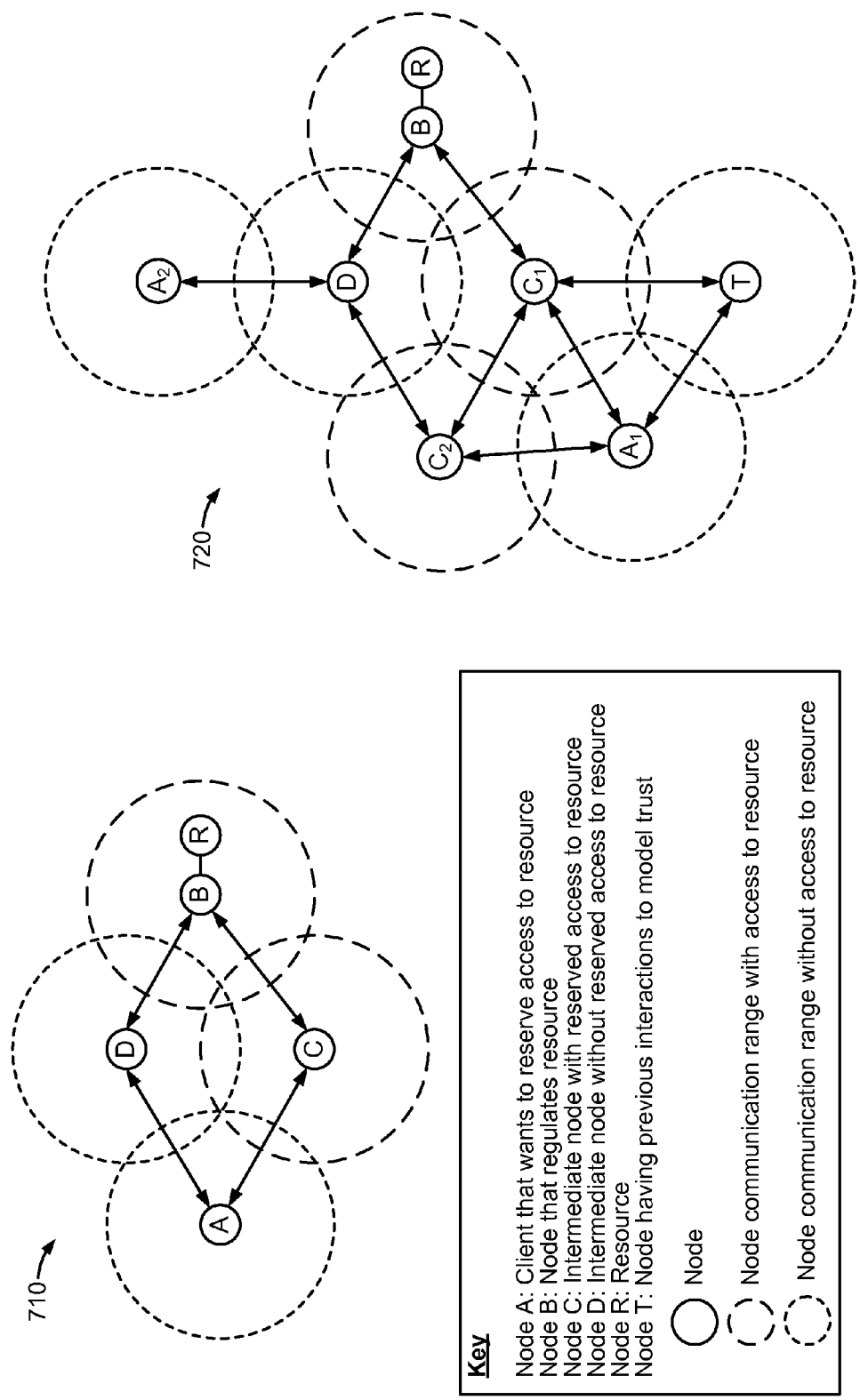
FIG. 7 illustrates exemplary communication scenarios in which a control load in an IoT resource access network may be reduced using a trust heuristic model, according to one aspect of the disclosure.

According to one aspect of the disclosure, FIG. 6 illustrates certain exemplary communication scenarios in which client IoT devices may request access to controlled resources in the IoT network, while FIG. 7 illustrates certain exemplary communication scenarios in which a control load in the IoT network may be reduced using the trust heuristic model disclosed herein. As shown in FIG. 6 and/or FIG. 7 and used herein, the term "Node R" may generally refer to a controlled resource in the IoT network, the term "Node A" may generally refer to a client IoT device that wants to reserve access to the controlled resource Node R, the term "Node B" may generally refer to a node in the IoT network that regulates access to the controlled resource Node R, the term "Node C" may generally refer to an intermediate node that has reserved access to the controlled resource Node R, the term "Node D" may generally refer to an intermediate node that does not have reserved access to the controlled resource Node R, and the term "Node T" may generally refer to a node that has previous interactions with a Node A that can be used to model one or more trust relationships associated with the Node A.

In one embodiment, as will be described in further detail herein, a particular Node R in the IoT network may generally be considered a finite resource or an infinite resource, wherein the mechanisms used to regulate access to the Node R may vary depending on whether the Node R corresponds to a finite or infinite resource. More particularly, infinite resources may generally have production rates that equal or exceed consumption rates and no access bottlenecks (e.g., access to a database may be considered infinite because accessing the database does not deplete the information stored therein, and moreover, because wireless bandwidth that may otherwise limit access to the database may not be considered a bottleneck at the database).

In contrast, finite resources may generally have consumption rates that exceed production rates, constrained delivery mechanisms, or both. For example, the power that a generator produces may be considered a finite resource because generators typically produce power at a fixed rate and the rate at which the power produced thereby is consumed may exceed the production rate during a time period in which substantial clients access the generator. In another example, a digital video recorder (DVR) with a connection that can only support recording one program at a time may be considered a finite resource having a constrained delivery mechanism because two simultaneous programs cannot be recorded thereon. In still another example, the DVR may be considered a finite resource having a limited quantity and a constrained delivery mechanism if a user wants to record a program on three DVRs and the connection only supports recording two programs at a time and the storage capacity available on the DVRs can only accommodate one program. Those skilled in the art will appreciate that the above concepts relating to whether a controlled resource may be considered infinite or finite can be applied to many other examples and use cases.

In traditional access modes used to regulate access to a controlled resource, a particular entity (e.g., an authentication server) may be a gatekeeper to the controlled resource and decide whether to admit clients to the controlled resource in response to the clients requesting access thereto. However, in peer-to-peer (P2P) access modes, a client may be unable to communicate with the gatekeeper entity (e.g., because the gatekeeper entity does not fall within the communication range associated with the client), whereby the client may instead communicate with an intermediary or edge node having access to the controlled resource in order to access to the controlled resource through the intermediary or edge node. Accordingly, the exemplary communication scenarios shown in FIG. 6 may generally represent various traditional access modes and/or conventional P2P access modes that may be used to regulate access to a controlled resource in an IoT network, and the subsequent description relating to FIG. 7 may demonstrate how the trust heuristic model described herein may augment traditional access modes and/or conventional P2P access modes to reduce the control load in the IoT network.

In particular, FIG. 6 illustrates one exemplary communication scenario 610 in which a client Node A wants to reserve access to a controlled resource Node R, and in which Node B regulates access to the controlled resource Node R. Furthermore, the respective dashed lines show the communication ranges associated with Node A and Node B, which intersect one another, whereby Node A can communicate directly with Node B and conventional mechanisms may be used to regulate access to controlled resource Node R. In one embodiment, a challenge-and-response mechanism may be used between Node A and Node B to authenticate or otherwise control access to controlled resource Node R, wherein Node B may send a challenge to Node A in response to an access request from Node A and determine whether to grant Node A access to the controlled resource Node R based on the response to the challenge. For example, the challenge-and-response mechanism may depend on a requesting node and an authentication node having a certificate that can be used to verify trust based on a shared secret (e.g., a password, a generic authentication mechanism, etc.). Furthermore, Node B may limit the access granted to Node A or alternatively provide Node A with unlimited access to the controlled resource (e.g., depending on whether the controlled resource Node R is finite or infinite). For example, Node A may represent a DSL modem, Node B may represent an Internet Service Provider (ISP), and Node R may represent limited bandwidth that the ISP allocates to the DSL modem. In a counter-example, Node A may represent a wireless device connecting to a wireless access point (WAP), Node B may represent the WAP, and Node R may represent unlimited bandwidth that the WAP grants to the Node A (e.g., although the bandwidth allocated to the WAP from an ISP may be limited, the WAP may not place any limits on the wireless device accessing the bandwidth allocated to the WAP).

Referring still to FIG. 6, in response to communication scenario 610 resulting in Node A successfully responding to the challenge from Node B and obtaining the requested access to controlled resource Node R, communication scenario 620 shows how Node A may become an intermediary Node C that has reserved access to the controlled resource Node R. In communication scenario 620, Node C may therefore be an intermediary node that can relay access requests to Node B from another Node A that does not have a communication range that allows direct contact with Node B. In a similar respect, communication scenario 630 includes an intermediary Node D that can receive access requests from Node A and relay the access requests to Node B despite not having reserved access to the controlled resource Node R. For example, in communication scenarios 620 and 630, Node C and Node D may respectively relay the access requests received from Node A to Node B and subsequently relay challenge-and-response messages between Node A and Node B that cannot directly communicate with one another in order to control access to controlled resource Node R. However, the intermediate Nodes C and D that relay the challenge-and-response messages between Node A and Node B may not be granted access to the controlled resource Node R, in that Nodes C and D instead generally enable communication between Node A and Node B that cannot directly communicate with one another except through the intermediary nodes. As such, in communication scenarios 620 and 630, Node C and Node D may generally be logical equivalents at least from the perspective of Node B that regulates access to controlled resource Node R.

Referring now to FIG. 7, certain exemplary communication scenarios are illustrated to demonstrate how the trust heuristic model disclosed herein may reduce a control load in the IoT network. For example, in communication scenario 710, a client Node A that wants to reserve access to controlled resource Node R may have a communication range that allows Node A to contact an intermediate Node C that has reserved access to the controlled resource Node R and an intermediate Node D that does not have reserved access to the controlled resource Node R. Furthermore, intermediate Node C and intermediate Node D may have respective communication ranges that allow direct contact with a Node B that regulates access to controlled resource Node R. Accordingly, in one embodiment, Node A may generally access controlled resource Node R through intermediary Node C and/or intermediary Node D, which can be generalized vertically and horizontally. More particularly, Node C and Node D can be vertically generalized in that many different nodes may know about Node A and/or Node B or be within a suitable communication range of Node A and/or Node B. For example, Node C and Node D have respective communication ranges within the communication range associated with Node A and the communication range associated with Node B in communication scenario 710. Similarly, in communication scenario 720, Node $C_1$, Node $C_2$, and Node T have respective communication ranges within the communication range associated with Node $A_1$, and moreover, Node T knows about Node $A_1$ from previous interactions that can be used to model trust associated with Node $A_1$. Furthermore, Node C and Node D can be horizontally generalized in that there could be one or more multiple intermediate nodes between Node B and a requesting client. For example, as shown in communication scenario 710, Node A can reach Node B through one intermediary node (e.g., either Node C or Node D). In another example, communication scenario 720 shows multiple intermediary nodes between Node $A_1$ and Node B, wherein Node $A_1$ can reach Node B through Node $C_2$ and Node D, in addition to one intermediary node between Node $A_1$ and Node B, wherein Node $A_1$ can reach Node B through Node $C_1$ alone. Those skilled in the art will appreciate that the above concepts relating to how a requesting client Node A contacts a Node B through one or more intermediaries that can be horizontally and/or vertically generalized can be applied to many other communication scenarios and use cases.

According to one aspect of the disclosure, various mechanisms that may be used to reduce a control load associated with requesting access to controlled resources in the IoT network using a trust heuristic model will now be described. In one embodiment, with particular reference to communication scenario 720, controlled resource Node R may be a limited or finite resource and each Node C that reserves access to the limited resource may request that Node B allocate R+e thereto, where R may have a value greater than or equal to zero that represents the amount of the controlled resource Node R that the Node C requires and e may have a value greater than zero that represents some extra amount of the controlled resource Node R that the Node C has reserved (e.g., a surplus amount that the Node C can supply to a requesting Node A). Accordingly, when a client Node $A_1$ subsequently wants to reserve access to the controlled resource Node R regulated by Node B, client Node $A_1$ may initially contact all Node Cs within the communication range associated therewith. For example, as shown in communication scenario 720, client Node $A_1$ may initially contact Node $C_1$ and Node $C_2$ to inquire about the extra capacity e that each Node C reserved to itself. Accordingly, if the amount of the controlled resource that Node $A_1$ requires ($R_a$) does not exceed the sum of the extra capacity e that each Node C reserved to itself ($e_1+e_2$), then intermediary Node $C_1$ and intermediary Node $C_2$ may issue challenges to Node $A_1$ and supply the requested resource $R_a$ to Node $A_1$ in response to Node $A_1$ returning a successful response to the challenge.

Furthermore, whereas the challenge-and-response mechanism may conventionally be repeated at regular intervals to ensure that nothing has changed and to periodically reauthenticate Node $A_1$, the trust heuristic model disclosed herein may reduce the control load (e.g., to avoid occupying unnecessary bandwidth in a wireless system). For example, Node $C_1$ and Node $C_2$ may issue the initial challenge to Node $A_1$ when Node $A_1$ requests the resource from Node $C_1$ and Node $C_2$ reduce the challenge interval after one or more successive responses. Alternatively, if Node $C_1$ and/or Node $C_2$ know Node $A_1$ from other interactions, then Node $C_1$ and/or Node $C_2$ may grant access to Node $A_1$ without employing the challenge-and-response mechanism. Accordingly, based on successive challenge-and-response exchanges that may occur over time among different nodes in the IoT network, trust and/or distrust between two or more nodes in the IoT network can be built or otherwise modeled at different levels in a similar manner to how people may categorize relationships with others according to acquaintances, colleagues, friends, confidants, and so on (e.g., as shown in FIG. 5 and described in further detail above).

Furthermore, an IoT network may generally be created on or otherwise include various different communication interfaces, which may include one or more wired interfaces and/or one or more air interfaces (e.g., a Wi-Fi air interface, a cellular air interface, etc.). Accordingly, in one embodiment, an IoT network implementing the trust heuristic model described herein may be created on or otherwise include different wired and/or air interfaces and determine the trust level associated with certain requesting nodes based on the communication interface that the requesting nodes use to communicate over the IoT network. For example, in one embodiment, requesting nodes that communicate over secure Wi-Fi connections may have a higher trust level than nodes that communicate over insecure Wi-Fi connections, requesting nodes that communicate over cellular interfaces may have a lower trust level than nodes that communicate over Wi-Fi interfaces, requesting nodes that communicate over wired connections may have a higher trust level than nodes that communicate over air interfaces, and so on. However, those skilled in the art will appreciate that the particular trust level that may be assigned to requesting nodes that based on the particular interface used to communicate with the IoT network may be suitably varied depending on the particular context associated with the IoT network.

Accordingly, because all the nodes in the IoT network may likely interact over several controlled resources, the trust heuristic model may substantially reduce the challenge-and-response messages needed to control access to the controlled resources and thereby substantially reduce the control load in the IoT network. For example, in one exemplary use case, Node $C_1$ may have access to controlled resources X, Y, and Z and Node $C_2$ may have access to controlled resource V, W, and X. In response to a new client Node $A_1$ being introduced to the environment and first interacting with Node $C_1$ to access controlled resource Z, trust may be modeled between Node $A_1$ and Node $C_1$. If client Node $A_1$ then requests resource W from Node $C_2$, which does not have any previous interactions with Node $A_1$, Node $C_2$ may query other devices within its communication range (e.g., in the "neighborhood" of devices) to determine whether the other devices have any trust relationships between Node $A_1$. For example, if Node $C_2$ queries Node $C_1$ and has a trust relationship with Node $C_1$ (e.g., based on interactions associated with controlled resource X), then Node $C_2$ may grant Node $A_1$ access to resource W without requiring a successful challenge-and-response. As such, the trust heuristic model may reduce the control load and the queries used to regulate access to controlled resources and still enable all devices to receive access to the controlled resources. Additionally, the processing load to develop complex challenge-and-response mechanisms can be substantially reduced because substantially fewer successful challenge-and-responses may be needed to control resource access. Further still, the trust heuristic model may provide an added security extension in wherein a requesting Node A that fails to successfully respond to challenges multiple times may be blocked from communicating over the IoT network for a certain time period or banned from the IoT network altogether (e.g., to prevent spam, brute force attacks, denial-of-service attacks, etc.). As such, the trust heuristic model may allow authorized nodes to ignore traffic from malicious offenders and thereby avoid disruptions to the IoT network due to junk data flooding the control channel.

Furthermore, in one embodiment, the trust heuristic model disclosed herein may be used to model trust based on each controlled resource in the IoT network in addition to substantially reducing the control load based on identities associated with trusted nodes (e.g., nodes that have successfully completed one or more challenge-and-response exchanges). For example, in one embodiment, certain controlled resources may require nodes to have a first clearance level that correlates with a certain trust level in order to gain access thereto (e.g., the Preliminary Trust level 520 shown in FIG. 5). As such, if a particular node has the trust level that provides appropriate clearance to access a controlled resource that requires the first clearance level and that node demonstrates responsibility when accessing that controlled resource (e.g., does not exceed allocated quotas), the node may then gain some nominal trust to access controlled resources that otherwise require a higher clearance level. Accordingly, in one embodiment, the trust heuristic model may be used to build trust on a per-resource basis and transfer a sub-portion of the trust between different resources such that the clearance level assigned to nodes may be nominally increased and/or subsequently committed based on how the nodes interact with resources with which the nodes are permitted to access.

Figure 8:
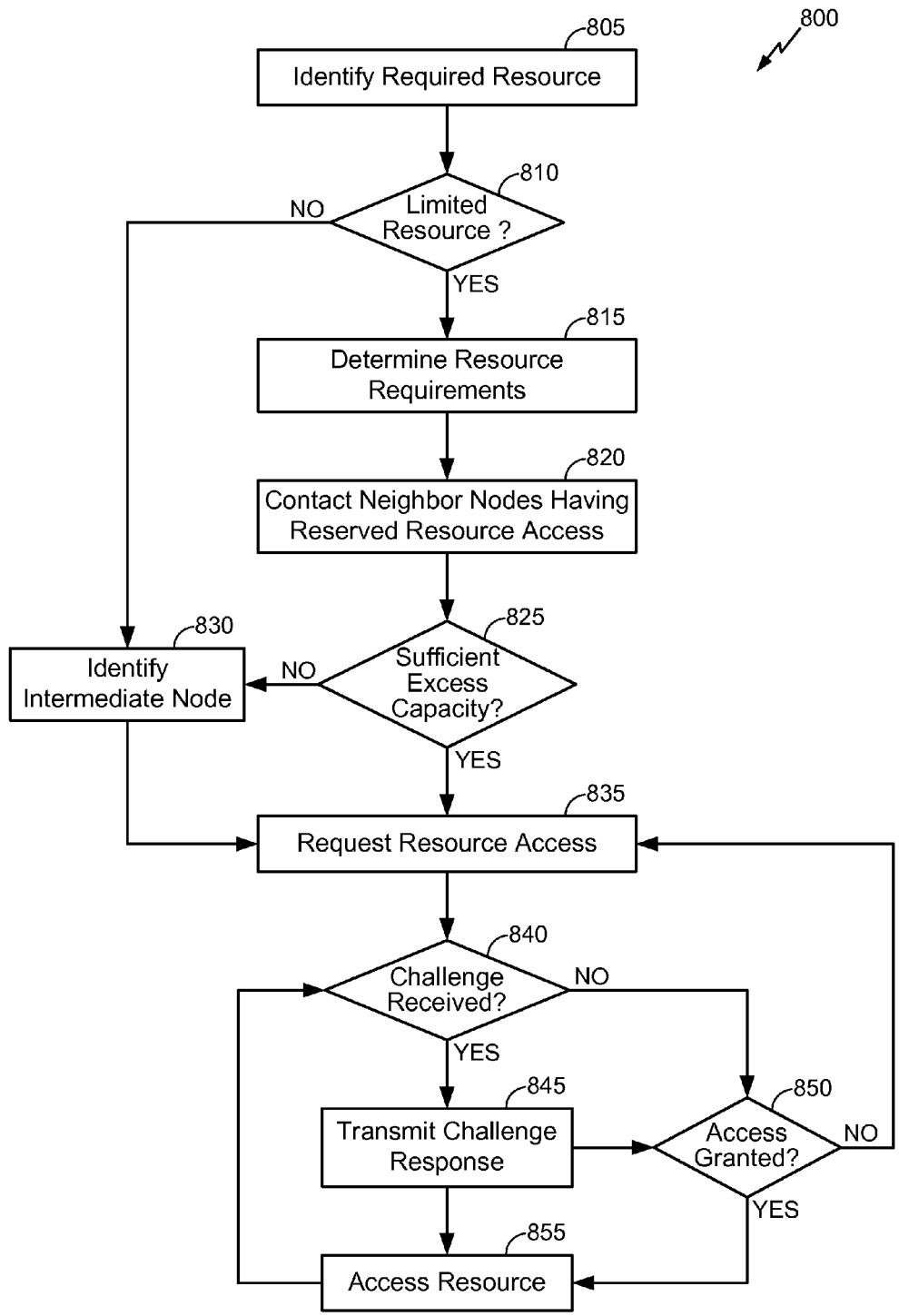
FIG. 8 illustrates an exemplary method that a client in an IoT network may perform to request access to a controlled resource and reduce a control load associated therewith based on a trust heuristic model, according to one aspect of the disclosure.

According to one aspect of the disclosure, FIG. 8 illustrates an exemplary method 800 that a client in the IoT network may perform to request access to a controlled resource and reduce a control load associated therewith based on a trust heuristic model. In particular, the client may initially identify a required resource to which the client wants to reserve access at block 805 and subsequently determine whether the identified resource is a limited (i.e., finite or otherwise constrained) resource or an infinite (i.e., unlimited and unconstrained) resource at block 810. In response to determining that the identified resource is limited, the client may then determine an amount R that represents the amount of the controlled resource that the client requires at block 815. The client may then contact all neighbor nodes within a communication range associated therewith that have reserved access to the identified resource. For example, as noted above, each neighbor node that reserves access to the limited resource may request R+e from the node that regulates access to the controlled resource, where R represents the amount of the controlled resource the node requires and e represents some extra amount of the controlled resource. Accordingly, the client may initially contact all the neighbor nodes that have reserved access to the controlled resource to inquire about the extra capacity e that each neighbor node reserved to itself and determine whether the amount of the controlled resource that the client requires ($R_a$) does not exceed the sum of the extra capacity e that each neighbor node reserved to itself ($e_1+e_2+\ldots e_n$) at block 825.

In one embodiment, if the client determines that the sum of the extra capacity e that each neighbor node reserved to itself is sufficient to meet the resource requirements determined at block 815, the client may then request access to the extra resource capacity from the neighbor nodes at block 835. Alternatively, if the client determines that the sum of the extra capacity e that each neighbor node reserved to itself is not sufficient to meet the resource requirements determined at block 815, or that the required resource is infinite, the client may identify an appropriate intermediate node from which to request the resource access at block 830 prior to requesting access to the resource from the intermediate node at block 835. In either case, the client may then determine whether a challenge was received in response to the resource access request at block 840.

For example, if the client does not have any previous interactions with the neighbor node and/or intermediary node to which the request was transmitted, the receiving node may issue a challenge to the client at block 840 and the client may subsequently transmit a response to the challenge at block 845. As such, the node that issued the challenge may supply the requested resource to the client and/or relay the request to the node regulating access to the controlled resource at block 850 in response to the client transmitting a successful response to the challenge at block 845, in which case the client may then access the resource at block 855. However, if the client fails to transmit a successful response to the challenge at block 845, the client may be denied access to the resource at block 850, in which case the client may return to block 835 to attempt to request access again. Alternatively, in response to determining that access to the resource was not granted at block 805, the client may return to block 830 (not shown) to attempt to access the resource through another intermediary node (e.g., if a neighbor node with excess capacity was unable to allocate the resource to the client) and/or resort to the traditional access modes mentioned above (e.g., attempting to contact the gatekeeper directly instead of continuing to attempt to request access to the resource through intermediary nodes).

Returning to block 840, if the client does have any interactions with the neighbor node and/or intermediary node to which the request was transmitted or the neighbor and/or intermediary node was otherwise able to determine that the client can be trusted, the client may not receive a challenge at block 840 and may instead be granted access to the resource at block 855 without requiring a successful challenge-and-response. Alternatively, the client may not receive a challenge at block 840 because the client may have failed to successfully respond to challenges multiple times and therefore been blocked from communicating over the IoT network for a certain time period or banned from the IoT network altogether. In this case, the client may similarly return to block 835 to attempt to request access again after the time period during which the client has been blocked has expired and/or return to block 830 (not shown) to attempt to access the resource through another intermediary node after the time period during which the client has been blocked has expired. However, those skilled in the art will appreciate that any attempts that the client makes to request access again may likewise fail if the client has been banned from the IoT network altogether or otherwise failed to transmit a successful response to the challenge because the client does not in fact have proper authentication credentials.

Figure 9:
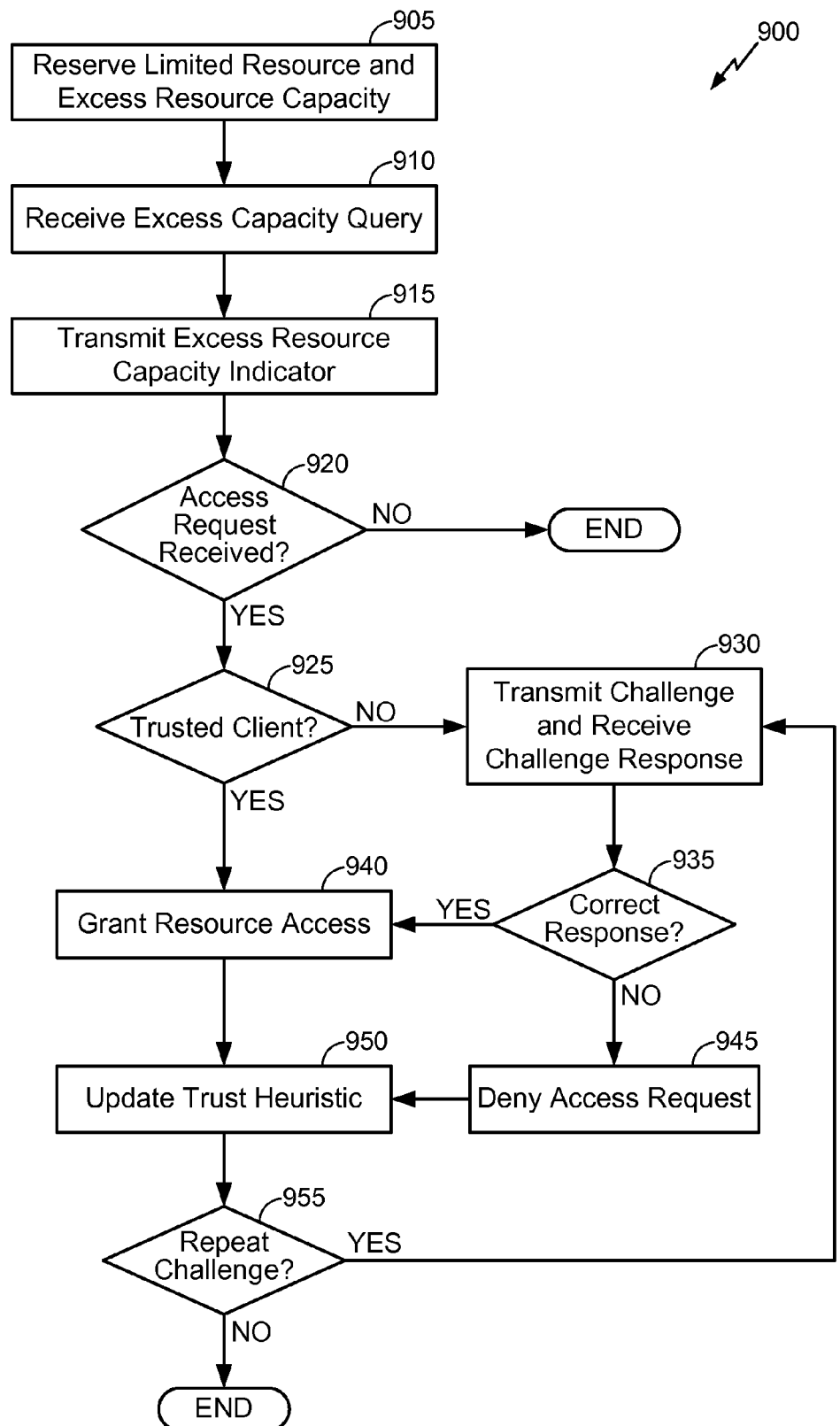
FIG. 9 illustrates an exemplary method that an intermediate node having reserved access to a controlled resource in an IoT network may perform to reduce a control load in the IoT network based on a trust heuristic model, according to one aspect of the disclosure.

According to one aspect of the disclosure, FIG. 9 illustrates an exemplary method 900 that an intermediate node having reserved access to a controlled resource in an IoT network may perform to reduce a control load in the IoT network based on a trust heuristic model. In particular, the intermediate note may initially communicate with a node that regulates access to the controlled resource at block 905 to request that the regulating node allocate R+e to the intermediate node, where R may have a value greater than or equal to zero that represents the amount of the controlled resource that the intermediate node requires and e may have a value greater than zero that represents some extra amount of the controlled resource that the intermediate node has reserved (e.g., a surplus amount that the intermediate node can supply to one or more requesting nodes). In one embodiment, the regulating node may employ a challenge-and-response mechanism to authenticate the request from the intermediate node, wherein the regulating node may send a challenge to the intermediate node in response to the request from the intermediate node and grant the request if the intermediate node successfully responds to the challenge.

In one embodiment, the intermediate node may then receive an excess capacity query from a client node that wants access to the controlled resource at block 910. For example, when the client node wants to reserve access to the controlled resource, the client node may contact all intermediate nodes within the communication range associated with the client node to inquire about the extra capacity e that each intermediate node reserved to itself at block 905. Accordingly, the intermediate node may then transmit information to the client node at block 915 that indicates the extra capacity e that the intermediate node reserved at block 905, wherein the client node may generally request the extra capacity e from the intermediate node if the amount of the controlled resource that the client node requires ($R_a$) does not exceed the sum of the extra capacity e that each intermediate node reserved to itself ($e_1+e_2+\ldots e_n$). As such, the intermediate node may determine whether an access request was received from the client node at block 920, which may not occur if $R_a$ exceeds the sum of the extra capacity e that each intermediate node reserved to itself, in which case the method 900 may then end. Furthermore, if the intermediate nodes that have reserved access to the resource are at maximum capacity or are otherwise unable to supply the extra capacity e to the client node, the client node may request access to the controlled resource from another intermediate node having a communication range that can reach the node regulating access to the controlled resource despite not already having reserved access to the controlled resource (e.g., a Node D as shown in FIGS. 6 and 7), and the Node D may then reserve access to the resource and thereby become a Node C in response to the access request from the client node. Alternatively, the client node may resort to the traditional access modes mentioned above and attempt to directly contact the node that regulates the controlled resource (e.g., a Node B as shown in FIGS. 6 and 7) if the intermediate nodes having the reserved access are unable to supply $R_a$ to the client node.

Otherwise, if $R_a$ does not exceed the sum of the extra capacity e that each intermediate node reserved to itself, the intermediate node may receive the access request at block 920. Alternatively, even if all the extra capacity e has been used and therefore cannot be used to supply $R_a$ to the client node, the intermediate node may attempt to access the controlled resource to reserve additional extra capacity e if the intermediate node is not at maximum capacity (not shown), in which case the intermediate node may then transmit an updated excess resource capacity indicator to the client node at block 915 in response to successfully reserving sufficient additional extra capacity e to supply $R_a$ to the client node. As such, the client node may then transmit the access request to the intermediate node in response to the excess resource capacity indicator (or updated excess resource capacity indicator) transmitted at block 915 indicating that $R_a$ can be supplied through the intermediate nodes. In any case, if the intermediate node receives the access request from the client node due to having sufficient extra capacity to supply $R_a$, the intermediate node may then determine whether the client node has a known trust relationship at block 925. For example, in response to a new client node being introduced to the environment and first interacting with the intermediate node to access a controlled resource, trust may be modeled between the client node and the intermediate node if the client node successfully responds to one or more challenges that the intermediate node issues to the client node, in which case the intermediate node may determine that the client node is a trusted client at block 925. Alternatively, if the intermediate node does not have any previous interactions with the client node, the intermediate node may query other devices within its communication range (e.g., in the "neighborhood" of devices) to determine whether the other devices have any trust relationships with the client node, in which case the intermediate node may similarly determine that the client node is a trusted client at block 925. As such, if the intermediate node determines that the client node is a trusted client, the intermediate node may grant the extra capacity e to the client node at block 940. Otherwise, if the intermediate node determines that the client node is not a trusted client (e.g., because the intermediate node does not have any prior interactions with the client node and no neighboring devices have prior interactions with the client node), the intermediate node may transmit a challenge to the client node at block 930 and determine whether the client node correctly responded to the challenge at block 935. The intermediate node may then grant the extra capacity e to the client node at block 940 if the client node correctly responded to the challenge or alternatively deny the access request at block 945 if the client node failed to successfully respond to the challenge.

In one embodiment, the intermediate node may then update the trust heuristic associated with the client node at block 950. For example, the intermediate node may reduce the challenge interval after one or more successive correct responses to the challenge from the client node or determine that no further challenge-and-response exchanges are required after the client node successfully responding to the challenge many times. Accordingly, trust between two or more nodes in the IoT network can be built or otherwise modeled in response to successful challenge-and-response exchanges over time. Furthermore, the trust may be modeled at different levels in a similar manner to how people may categorize relationships with others according to acquaintances, colleagues, friends, confidants, and so on. For example, as shown in FIG. 5 and described in further detail above, resources can be aligned along similar paths to allow nodes to build trust, wherein the trust heuristic may be updated at block 950 to allow the client node into the IoT network, have messages forwarded or relayed, allowed to access plentiful or infinite resources (e.g., electricity), allowed access to limited, constrained, or other finite resources (e.g., Wi-Fi), and/or allowed access to protected resources (e.g., database records). Alternatively, if the client node did not successfully respond to the challenge and the intermediary node therefore denied the access request at block 945, the trust heuristic may be updated at block 950 to reduce the trust level associated with the client node and/or block the client node from communicating over the IoT network for a certain time period or ban the client node from the IoT network altogether if the client node fails to successfully respond to challenges multiple times. Accordingly, in response to suitably updating the trust heuristic, the intermediary node may then determine whether additional challenge-and-response exchanges may be needed at block 955 (e.g., if the client node has something other than a sufficiently high trust level) and return to block 930 to repeat the challenge-and-response exchange after the challenge interval has expired. Otherwise, if the intermediary node determines that no further challenge-and-response exchanges are needed at block 955 (e.g., if the client node has a sufficiently high trust level), the method 900 may end with the client node having been granted access to the controlled resource without having to respond to any further challenges.

Figure 10:
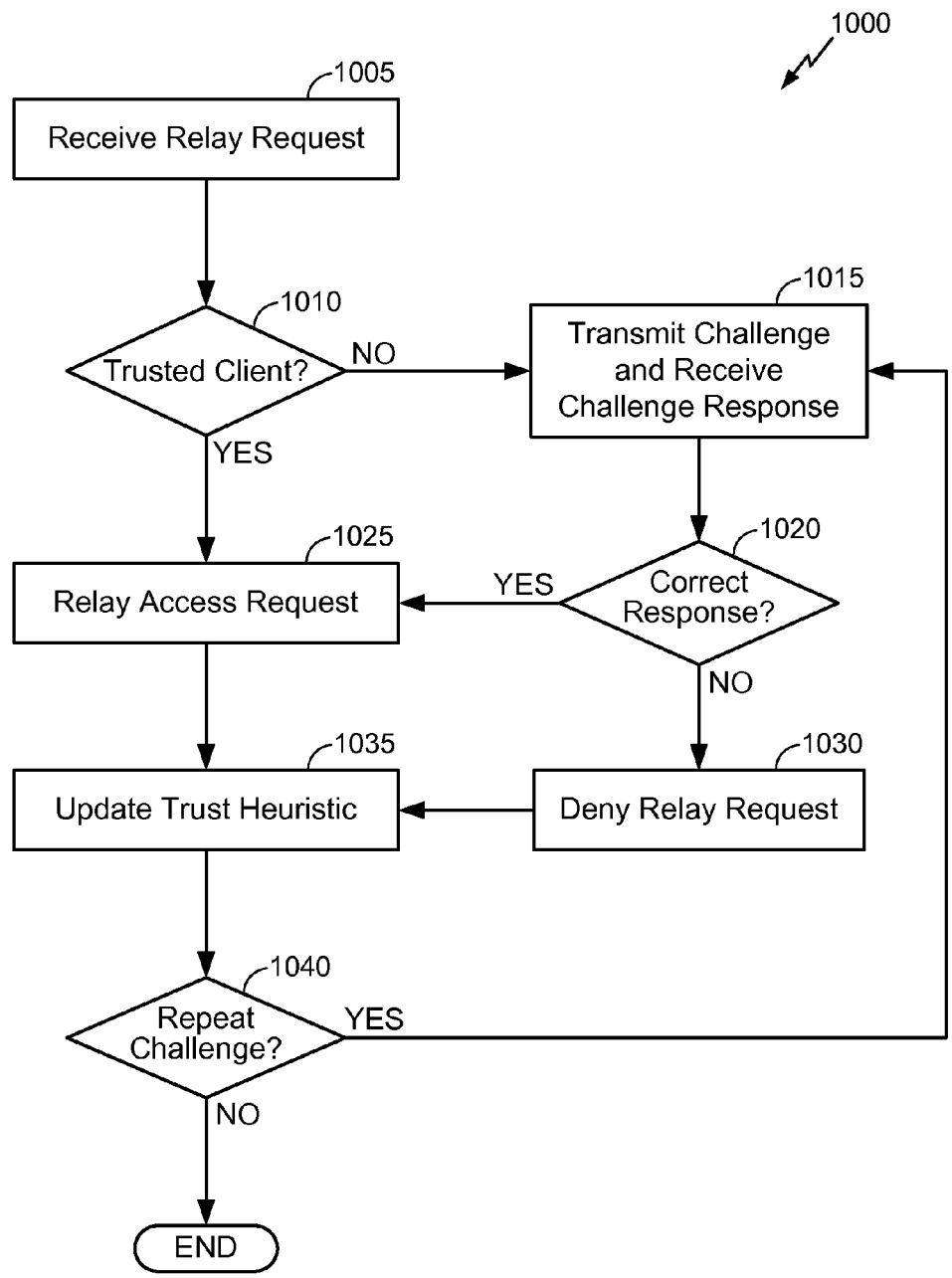
FIG. 10 illustrates an exemplary method that an intermediate node without reserved access to a controlled resource in an IoT network may perform to reduce a control load in the IoT network based on a trust heuristic model, according to one aspect of the disclosure.

According to one aspect of the disclosure, FIG. 10 illustrates an exemplary method 1000 that an intermediate node without reserved access to a controlled resource in an IoT network may perform to reduce a control load in the IoT network based on a trust heuristic model. In particular, in response to a client node determining that certain intermediate nodes having reserved access to the controlled resource do not have sufficient excess capacity to supply the amount of the controlled resource that the client node requires, an intermediate node may receive a relay request from the client node at block 1005. For example, the client node may generally transmit the relay request in order to reach a node that regulates access to the controlled resource if the client node does not have a communication range that allows the client node to contact the regulating node directly, whereby the intermediate node may communicate with the regulating node via one or more hops on behalf of the client node. In one embodiment, in response to receiving the relay request, the intermediate node may then determine whether the client node has a known trust relationship at block 1010.

For example, in response to a new client node being introduced to the environment and first interacting with the intermediate node to access a controlled resource, trust may be modeled between the client node and the intermediate node if the client node successfully responds to one or more challenges that the intermediate node issues to the client node, in which case the intermediate node may determine that the client node is a trusted client at block 1010. Alternatively, if the intermediate node does not have any previous interactions with the client node, the intermediate node may query other devices within its communication range (e.g., in the "neighborhood" of devices) to determine whether the other devices have any trust relationships with the client node, in which case the intermediate node may similarly determine that the client node is a trusted client at block 1010. As such, if the intermediate node determines that the client node is a trusted client, the intermediate node may relay the access request from the client node to the regulating node at block 1025. Otherwise, if the intermediate node determines that the client node is not a trusted client (e.g., because the intermediate node does not have any prior interactions with the client node and no neighboring devices have prior interactions with the client node), the intermediate node may transmit a challenge to the client node at block 1015 and determine whether the client node correctly responded to the challenge at block 1020. The intermediate node may then relay the access request from the client node to the regulating node at block 1025 if the client node correctly responded to the challenge or deny the relay request at block 1030 if the client node failed to successfully respond to the challenge.

In one embodiment, the intermediate node may then update the trust heuristic associated with the client node at block 1035. For example, the intermediate node may reduce the challenge interval after one or more successive correct responses to the challenge from the client node or determine that no further challenge-and-response exchanges are required after the client node successfully responding to the challenge many times. Accordingly, trust between two or more nodes in the IoT network can be built or otherwise modeled in response to successful challenge-and-response exchanges over time. For example, as shown in FIG. 5 and described in further detail above, the trust heuristic may be updated at block 1035 to allow the client node into the IoT network, have messages forwarded or relayed, allowed to access plentiful or infinite resources (e.g., electricity), allowed access to limited, constrained, or other finite resources (e.g., Wi-Fi), and/or allowed access to protected resources (e.g., database records). Alternatively, if the client node did not successfully respond to the challenge and the intermediary node therefore denied the relay request at block 1030, the trust heuristic may be updated at block 1035 to reduce the trust level associated with the client node and/or block the client node from communicating over the IoT network for a certain time period or ban the client node from the IoT network altogether if the client node fails to successfully respond to challenges multiple times. Accordingly, in response to suitably updating the trust heuristic, the intermediary node may then determine whether additional challenge-and-response exchanges may be needed at block 1040 (e.g., if the client node has something other than a sufficiently high trust level) and return to block 1015 to repeat the challenge-and-response exchange after the challenge interval has expired. Otherwise, if the intermediary node determines that no further challenge-and-response exchanges are needed at block 1040 (e.g., if the client node has a sufficiently high trust level), the method 1000 may end with the client node having been authorized to have access requests automatically relayed to without having to respond to any further challenges.

Figure 11:
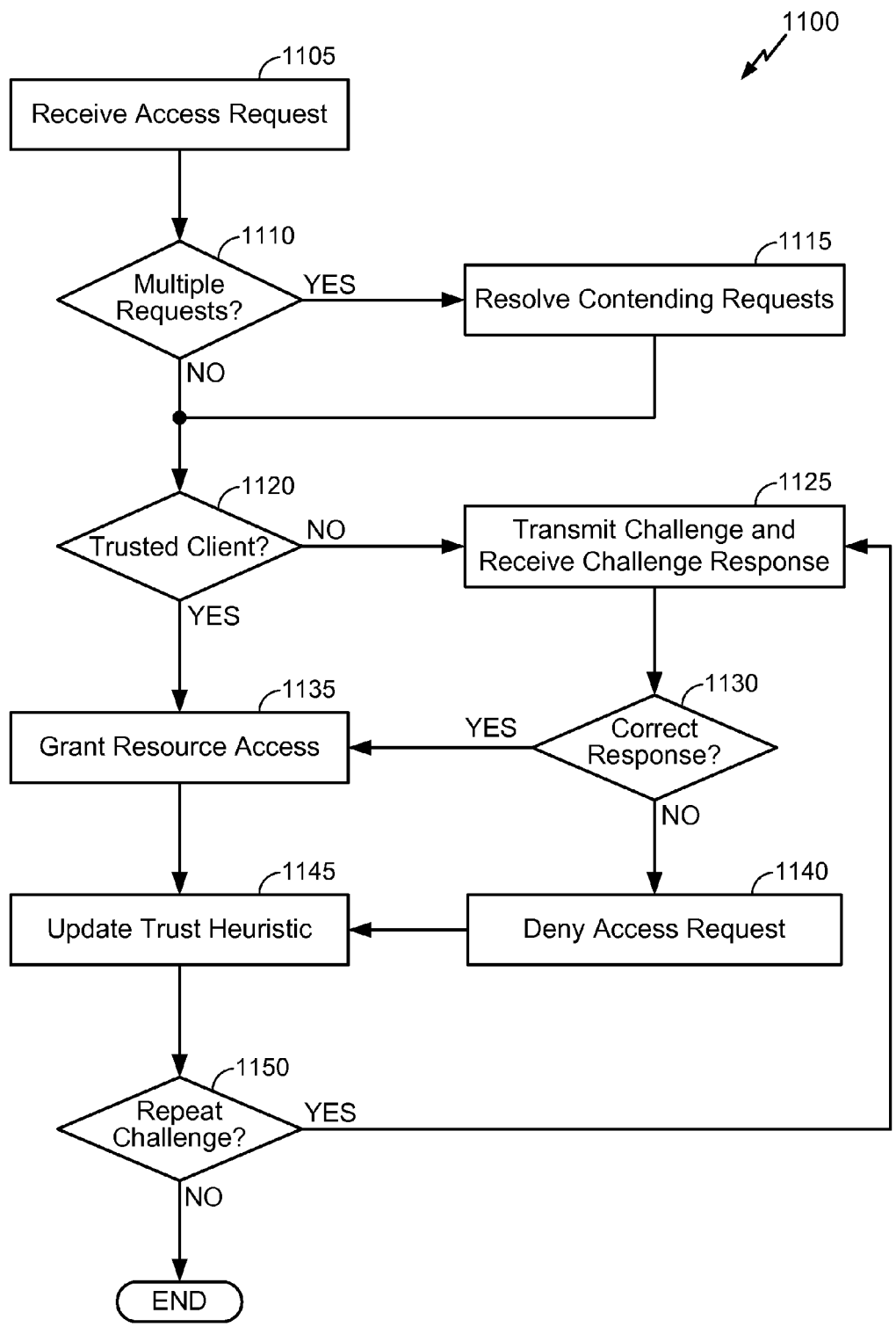
FIG. 11 illustrates an exemplary method that a node regulating access to a controlled resource in an IoT network may perform to reduce a control load in the IoT network based on a trust heuristic model, according to one aspect of the disclosure.

According to one aspect of the disclosure, FIG. 11 illustrates an exemplary method 1100 that a node regulating access to a controlled resource in an IoT network may perform to reduce a control load in the IoT network based on a trust heuristic model. In particular, at block 1105, the regulating node may initially receive one or more requests to access the controlled resource regulated thereby at block 1105. In one embodiment, the regulating node may determine whether multiple requests to access the controlled resource at block 1110, wherein the regulating node may resolve any contending requests to access the controlled resource at block 1115 in response to determining that multiple requests to access the controlled resource have been received. For example, in one embodiment, various client nodes and/or intermediate nodes may be organized into one or more groups based on performing similar activities, working together on certain controlled resources, or otherwise having certain characteristics, and the groups may be organized in a hierarchical manner to rank or otherwise define relative priorities among the various groups and/or the various client nodes and/or intermediate nodes organized into the groups.

Accordingly, in one embodiment, the regulating node may resolve the contending requests at block 1115 based on the relative rankings or priorities associated with the nodes from which the multiple requests were received, certain policies that control access to the controlled resource, policies that enable different nodes to interact with each other and share resource access, policies that regulate how the controlled resource may be utilized (e.g., constraining access to a finite or otherwise limited resource to one or N users at a time, a maximum usage duration, a certain location or time, etc.). For example, the regulating node may resolve the contending requests to determine an order in which the nodes that transmitted the access requests will be granted access to the controlled resource, a maximum duration that each node can access the controlled resource, amounts of the controlled resource to allocate to the various nodes in order to ensure that each access request can be suitably satisfied, or otherwise resolve any contention to the controlled resource (especially if the controlled resource has a limited quantity, a constrained delivery mechanism, or other finite properties). In another example, if the regulating node determines that the controlled resource is unavailable (e.g., because the controlled resource is occupied, a higher-priority node that cannot be pre-empted currently holds a floor to the controlled resource, etc.), the regulating node may queue the access request that was received at block 1105 and/or other access requests that contend therewith block 1115 until the resource becomes sufficiently available, at which time the regulating node may proceed to block 1120 to initiate a procedure to authenticate the received access request.

In one embodiment, at block 1120, the regulating node may then determine whether the requesting node that transmitted the access request received at block 1105 has a known trust relationship in response to suitably resolving the contending access requests at block 1115 or alternatively determining that multiple contending requests to access the controlled resource are not pending at block 1110. For example, in response to a new node being introduced to the environment and first interacting with the regulating node to access the controlled resource, trust may be modeled between the requesting node and the regulating node if the requesting node successfully responds to one or more challenges that the regulating node issues to the requesting node, in which case the regulating node may determine that the requesting node is a trusted client at block 1120. Alternatively, if the regulating node does not have any previous interactions with the requesting node, the regulating node may query other devices to determine whether any trust relationships with the requesting node have been modeled, in which case the regulating node may similarly determine that the requesting node is a trusted client at block 1120. As such, if the regulating node determines that the requesting node is a trusted client, the regulating node may grant the access request from the requesting node at block 1135 (e.g., in the manner described in further detail above with reference to FIG. 6 and FIG. 7). Otherwise, if the regulating node determines that the requesting node is not a trusted client (e.g., because the regulating node does not have any prior interactions with the requesting node and no neighboring devices have prior interactions with the requesting node), the regulating node may transmit a challenge to the requesting node at block 1125 and determine whether the requesting node correctly responded to the challenge at block 1130. The regulating node may then grant the access request at block

1135 if the requesting node correctly responded to the challenge or alternatively deny the access request at block 1140 if the requesting node failed to successfully respond to the challenge.

In one embodiment, the regulating node may then update the trust heuristic associated with the requesting node at block 1145. For example, the regulating node may reduce the challenge interval after one or more successive correct responses to the challenge from the requesting node or determine that no further challenge-and-response exchanges are required after the requesting node successfully responding to the challenge many times. Accordingly, trust between two or more nodes in the IoT network can be built or otherwise modeled in response to successful challenge-and-response exchanges over time. For example, as shown in FIG. 5 and described in further detail above, the trust heuristic may be updated at block 1145 to allow the requesting node into the IoT network, have messages forwarded or relayed, allowed to access plentiful or infinite resources (e.g., electricity), allowed access to limited, constrained, or other finite resources (e.g., Wi-Fi), and/or allowed access to protected resources (e.g., database records). Alternatively, if the requesting node did not successfully respond to the challenge and the regulating node therefore denied the relay request at block 1140, the trust heuristic may be updated at block 1145 to reduce the trust level associated with the requesting node and/or block the requesting node from communicating over the IoT network for a certain time period or ban the requesting node from the IoT network altogether if the requesting node fails to successfully respond to challenges multiple times. Accordingly, in response to suitably updating the trust heuristic, the regulating node may then determine whether additional challenge-and-response exchanges may be needed at block 1150 (e.g., if the requesting node has something other than a sufficiently high trust level) and return to block 1125 to repeat the challenge-and-response exchange after the challenge interval has expired. Otherwise, if the regulating node determines that no further challenge-and-response exchanges are needed at block 1150 (e.g., if the requesting node has a sufficiently high trust level), the method 1100 may end with the requesting node having been authorized to have access requests automatically relayed to without having to respond to further challenges.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for controlled resource access in an Internet of Things (IoT) network, comprising:
   requesting, by a requesting node, access to a first controlled resource in the IoT network, wherein access to the first controlled resource includes a requirement to periodically repeat an authentication procedure;
   responding to a challenge message received from a first gatekeeper node, wherein the first gatekeeper node is configured to deny access to the first controlled resource when the response to the challenge message is incorrect; and
   receiving the requested access to the first controlled resource in response to correctly responding to the challenge message, wherein the first gatekeeper node increases a time before the requesting node is required to repeat the authentication procedure in response to the requesting node correctly responding to two or more successive challenge messages.

2. The method recited in claim 1, wherein the challenge message and the response to the challenge message are exchanged over a control channel associated with the IoT network.

3. The method recited in claim 1, wherein the first gatekeeper node increases a trust level associated with the requesting node in response to the requesting node correctly responding to the challenge message.

4. The method recited in claim 1, wherein the first gatekeeper node increases an interval before transmitting a subsequent challenge message to the requesting node to increase the time before the requesting node is required to repeat the authentication procedure.

5. The method recited in claim 1, wherein the first gatekeeper node decreases a trust level associated with the requesting node in response to receiving an incorrect response to the challenge message from the requesting node.

6. The method recited in claim 1, wherein the first gatekeeper node temporarily blocks the requesting node from communicating over the IoT network in response to the requesting node incorrectly responding to two or more successive challenge messages.

7. The method recited in claim 6, wherein the first gatekeeper node permanently bans the requesting node from communicating over the IoT network in response to the requesting node continuing to incorrectly respond to one or more successive challenge messages over time.

8. The method recited in claim 1, wherein the first gatekeeper node adjusts the requirement to periodically repeat the authentication procedure according to a trust level assigned to the requesting node in response to the IoT network migrating to a new network access layer.

9. The method recited in claim 1, further comprising:
   requesting access to a second controlled resource from a second gatekeeper node, wherein the second gatekeeper node determines whether to grant the requesting node access to the second controlled resource based solely on a trust level between the requesting node and a trusted node having one or more previous interactions with the requesting node.

10. The method recited in claim 9, wherein a second IoT network includes one or more of the second controlled resource, the second gatekeeper node, or the trusted node having the one or more previous interactions with the requesting node.

11. The method recited in claim 9, wherein the trust level associated with the requesting node comprises one of N trust levels in a trust heuristic logical model that defines one or more resources in the IoT network that nodes having each respective trust level are permitted to access.

12. The method recited in claim 1, wherein the first gatekeeper node comprises a regulating node that regulates access to the first controlled resource.

13. The method recited in claim 1, wherein the first gatekeeper node comprises an intermediate node that relays messages between the requesting node and a regulating node that regulates access to the first controlled resource.

14. The method recited in claim 1, wherein the first controlled resource comprises an infinite resource having a production rate that equals or exceeds a consumption rate.

15. The method recited in claim 1, wherein the first controlled resource comprises a finite resource having a consumption rate that exceeds a production rate.

16. The method recited in claim 15, wherein the first gatekeeper node comprises an intermediate node having allocated access to the finite resource, and wherein the access allocated to the intermediate node comprises a first portion that the intermediate node requires and an extra portion that can be supplied to one or more requesting nodes.

17. The method recited in claim 16, wherein requesting the access to the first controlled resource further comprises:
   contacting one or more intermediate nodes that have allocated access to the finite resource to determine a total extra portion of the finite resource allocated thereto; and
   requesting that the one or more intermediate nodes supply an amount of the finite resource that the requesting node requires in response to determining that the total extra portion of the finite resource allocated thereto meets or exceeds the amount of the finite resource that the requesting node requires.

18. The method recited in claim 17, wherein responding to the challenge message further comprises:
   receiving the challenge message from the one or more intermediate nodes in response to requesting that the one or more intermediate nodes supply the amount of the finite resource that the requesting node requires; and
   receiving the required amount of the finite resource from the one or more intermediate nodes in response to transmitting a correct response to the challenge message to each intermediate node.

19. An Internet of Things (IoT) device, comprising:
   a transceiver configured to:
      transmit a request to access a controlled resource in an IoT network, wherein access to the controlled resource includes a requirement to periodically repeat an authentication procedure; and
      respond to a challenge message received from a gatekeeper node, wherein the gatekeeper node is configured to deny access to the controlled resource when the response to the challenge message is incorrect; and
   at least one processor, coupled to the transceiver, and configured to receive the requested access to the controlled resource based on a correct response to the challenge message, wherein the gatekeeper node is configured to increase a time before the requesting node is required to repeat the authentication procedure in response to the IoT device correctly responding to two or more successive challenge messages.

20. The IoT device recited in claim 19, wherein the controlled resource comprises a finite resource having a consumption rate that exceeds a production rate, wherein the first gatekeeper node comprises an intermediate node having allocated access to the finite resource, wherein the access allocated to the intermediate node comprises a first portion that the intermediate node requires and an extra portion that can be supplied to one or more requesting nodes, and wherein the at least one processor is further configured to:
contact one or more intermediate nodes that have allocated access to the finite resource to determine a total extra portion of the finite resource allocated thereto;
request that the one or more intermediate nodes supply an amount of the finite resource that the IoT device requires in response to the total extra portion of the finite resource allocated thereto meeting or exceeding the amount of the finite resource that the IoT device node requires;
receive, via the transceiver, the challenge message from the one or more intermediate nodes in response to requesting that the one or more intermediate nodes supply the amount of the finite resource that the IoT device requires;
transmit, via the transceiver, a response to the challenge message to each intermediate node; and
receive the required amount of the finite resource from the one or more intermediate nodes in response to the transmitted response being a correct response to the challenge message.

21. A "non-transitory" computer-readable storage medium having computer-executable instructions recorded thereon, wherein executing the computer-executable instructions on an Internet of Things (IoT) device causes the IoT device to:
request access to a controlled resource in an IoT network, wherein access to the controlled resource includes a requirement to periodically repeat an authentication procedure;
respond to a challenge message received from a gatekeeper node, wherein the gatekeeper node is configured to deny access to the controlled resource when the response to the challenge message is incorrect; and
receive the requested access to the controlled resource in response to correctly responding to the challenge message, wherein the gatekeeper node is configured to increase a time before the requesting node is required to repeat the authentication procedure in response to the IoT device correctly responding to two or more successive challenge messages.

22. The "non-transitory" computer-readable storage medium recited in claim 21, wherein the controlled resource comprises a finite resource having a consumption rate that exceeds a production rate, wherein the first gatekeeper node comprises an intermediate node having allocated access to the finite resource, wherein the access allocated to the intermediate node comprises a first portion that the intermediate node requires and an extra portion that can be supplied to one or more requesting nodes, and wherein executing the computer-executable instructions on the IoT device further causes the IoT device to:
contact one or more intermediate nodes that have allocated access to the finite resource to determine a total extra portion of the finite resource allocated thereto;
request that the one or more intermediate nodes supply an amount of the finite resource that the IoT device requires in response to the total extra portion of the finite resource allocated thereto meeting or exceeding the amount of the finite resource that the IoT device node requires;
receive the challenge message from the one or more intermediate nodes in response to requesting that the one or more intermediate nodes supply the amount of the finite resource that the IoT device requires;
transmit a response to the challenge message to each intermediate node; and
receive the required amount of the finite resource from the one or more intermediate nodes in response to the transmitted response being a correct response to the challenge message.

23. A method for controlling resource access in an Internet of Things (IoT) network, comprising:
receiving, at a gatekeeper node, a request to access a controlled resource in the IoT network from a requesting node, wherein access to the controlled resource includes a requirement to periodically repeat an authentication procedure;
transmitting a challenge message to the requesting node;
receiving a response to the challenge message from the requesting node;
determining whether to grant the requesting node access to the controlled resource based on the received response to the challenge message, wherein the requesting node is granted access to the controlled resource when the received response is correct or denied access to the controlled resource when the received response is incorrect; and
increasing a time before the requesting node is required to repeat the authentication procedure in response to the requesting node correctly responding to two or more successive challenge messages.

24. The method recited in claim 23, further comprising:
increasing a trust level assigned to the requesting node and increasing an interval before transmitting a subsequent challenge message to the requesting node in response to determining that the received response to the challenge message was correct.

25. The method recited in claim 23, further comprising:
decreasing a trust level assigned to the requesting node in response to determining that the received response to the challenge message was incorrect.

26. The method recited in claim 25, further comprising:
blocking the requesting node from communicating over the IoT network in response to the requesting node incorrectly responding to two or more successive challenge messages.

27. The method recited in claim 23, further comprising:
adjusting the requirement to periodically repeat the authentication procedure according to a trust level assigned to the requesting node in response to the IoT network migrating to a new network access layer.

28. The method recited in claim 23, further comprising:
assigning a trust level to the requesting node based on the received response to the challenge message, wherein the trust level assigned to the requesting node comprises one of N trust levels in a trust heuristic logical model that defines one or more resources in the IoT network that nodes having each respective trust level are permitted to access; and
communicating the trust level assigned to the requesting node to another node that regulates access to one or more resources in the IoT network, wherein the other node in the IoT network determines whether to grant the requesting node access to the one or more regulated resources based solely on the trust level assigned to the requesting node.

29. The method recited in claim 23, wherein the gatekeeper node has allocated access to the controlled resource, and wherein the access allocated to the gatekeeper node comprises a portion required by the gatekeeper node and an extra portion that can be supplied to the requesting node.

30. The method recited in claim 29, wherein determining whether to grant the requesting node access to the controlled resource comprises:

supplying the requesting node with the extra portion of the allocated access to the controlled resource in response to determining that the received response to the challenge message was correct, wherein the controlled resource comprises a finite resource having a consumption rate that exceeds a production rate.

31. The method recited in claim 30, wherein the gatekeeper node transmits the challenge message to the requesting node in response to the requesting node requesting that the gatekeeper node supply the extra portion of the allocated access to the controlled resource.

32. The method recited in claim 23, wherein the controlled resource comprises one or more of an infinite resource having a production rate that equals or exceeds a consumption rate or a finite resource having a consumption rate that exceeds a production rate.

\* \* \* \* \*